US012278427B2

(12) United States Patent
Hussain

(10) Patent No.: US 12,278,427 B2
(45) Date of Patent: Apr. 15, 2025

(54) CUBESAT MIMO ANTENNA WITH PATTERN DIVERSITY

(71) Applicant: KING FAHD UNIVERSITY OF PETROLEUM AND MINERALS, Dhahran (SA)

(72) Inventor: Rifaqat Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 216 days.

(21) Appl. No.: 18/193,896

(22) Filed: Mar. 31, 2023

(65) Prior Publication Data

US 2024/0332812 A1 Oct. 3, 2024

(51) Int. Cl.
*H01Q 13/16* (2006.01)
*H01Q 1/28* (2006.01)
(Continued)

(52) U.S. Cl.
CPC ............. *H01Q 13/16* (2013.01); *H01Q 1/288* (2013.01); *H01Q 13/02* (2013.01); *H01Q 21/0006* (2013.01)

(58) Field of Classification Search
CPC ........ H01Q 1/288; H01Q 13/02; H01Q 13/16; H01Q 21/0006
See application file for complete search history.

(56) References Cited

U.S. PATENT DOCUMENTS 11,450,968 B1 * 9/2022 Hussain ................. H01Q 21/28
11,450,969 B1 * 9/2022 Hussain ................. H01Q 5/321
(Continued)

FOREIGN PATENT DOCUMENTS

EP 0 860 894 B1 8/2007
IN 202241022910 5/2022

OTHER PUBLICATIONS

W.-H. Ng, E.-H. Lim, F.-L. Bong and B.-K. Chung, "Folded Patch Antenna With Tunable Inductive Slots and Stubs for UHF Tag Design," in IEEE Transactions on Antennas and Propagation, vol. 66, No. 6, pp. 2799-2806, Jun. 2018, doi: 10.1109/TAP.2018.2821702 (Year: 2018).*
(Continued)

*Primary Examiner* — Hoang V Nguyen
*Assistant Examiner* — Amal Patel
(74) *Attorney, Agent, or Firm* — Oblon, McClelland, Maier & Neustadt, L.L.P.

(57) ABSTRACT

A four element folded slot-based multiple-input-multiple-output (MIMO) antenna for use with CubeSats is described. The MIMO antenna includes a dielectric circuit board, and a metallic layer that covers a top side of the dielectric circuit board and covers a first portion and a second portion of a bottom side. A first meandering slot wraps from the top side, over the first edge and into the first portion on the bottom side. A second meandering slot wraps from the top side, over the second edge and into the second portion of the bottom side. A first feed horn is directed towards the first meandering slot. A second feed horn is directed towards the second meandering slot. A first capacitor is connected to the metallic layer across a slot section of the first meandering slot. A second capacitor connected to the metallic layer across a slot section of the second meandering slot.

15 Claims, 15 Drawing Sheets

(51) Int. Cl.
*H01Q 13/02* (2006.01)
*H01Q 21/00* (2006.01)

(56) References Cited

U.S. PATENT DOCUMENTS

| | | | | |
|---|---|---|---|---|
| 2008/0088519 | A1 | 4/2008 | Quan et al. | |
| 2012/0139793 | A1 * | 6/2012 | Sharawi ................ | H01Q 9/065 343/700 MS |

OTHER PUBLICATIONS

Y. Li, S. K. Podilchak, D. E. Anagnostou, C. Constantinides and T. Walkinshaw, "Compact Antenna for Picosatellites Using a Meandered Folded-Shorted Patch Array," in IEEE Antennas and Wireless Propagation Letters, vol. 19, No. 3, pp. 477-481, Mar. 2020, doi: 10.1109/LAWP.2020.2966088 (Year: 2020).*
Li et al. ; Compact Antenna for Picosatellites Using a Meandered Folded-Shorted Patch Array ; IEEE Antennas and Wireless Propagation Letters, vol. 19, Issue 3 ; Jan. 13, 2020 ; Abstract Only ; 2 Pages.
Ng et al. ; Folded Patch Antenna With Tunable Inductive Slots and Stubs for UHF Tag Design ; IEEE Transactions on Antennas and Propagation, vol. 66, Issue 6 ; Apr. 2, 2018 ; Abstract Only ; 3 Pages.
Hussain et al. ; Miniaturized Slot MIMO Antenna with Pattern Diversity for CubeSat Applications ; IEEE Xplore ; 2022 IEEE International Symposium on Antennas and Propagation and USNC-URSI Radio Science Meeting (AP-S/USNC-URSI) ; 2 Pages.

* cited by examiner

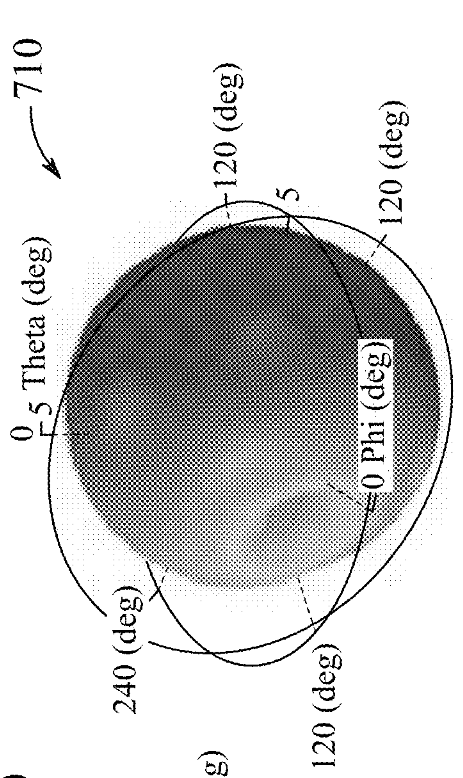
FIG. 7B
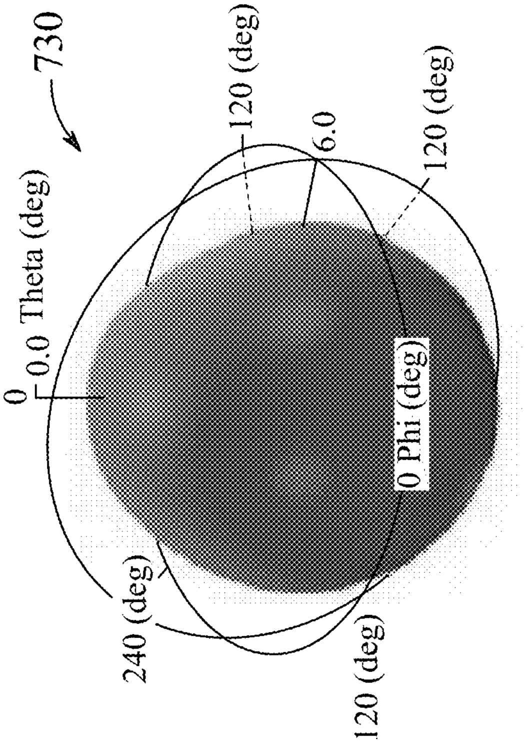
FIG. 7D
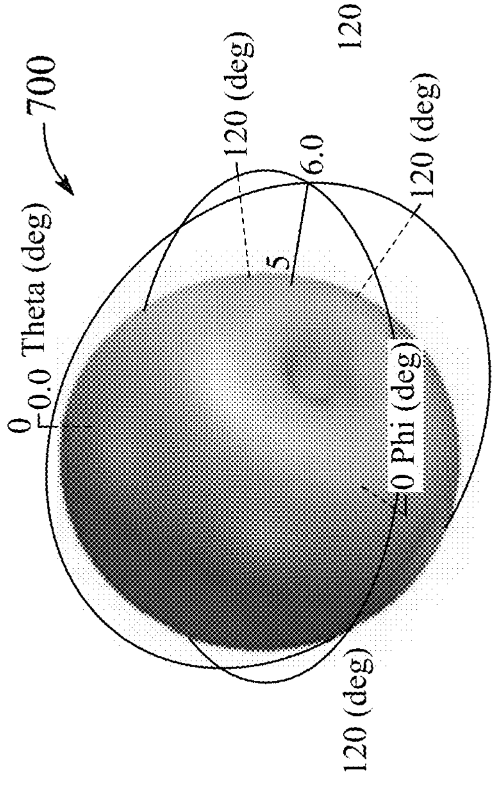
FIG. 7A
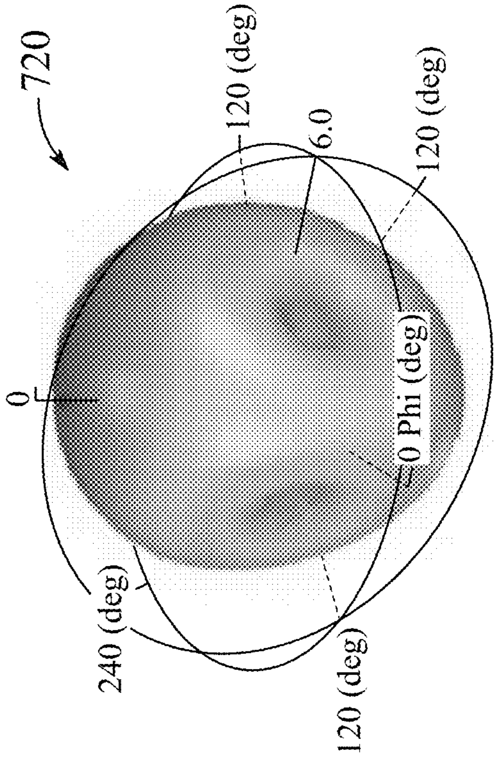
FIG. 7C
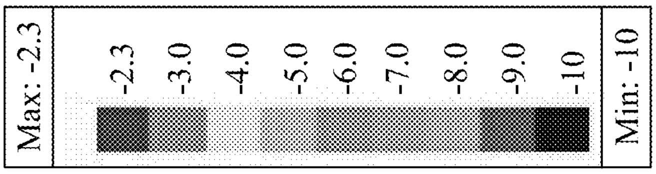

CUBESAT MIMO ANTENNA WITH PATTERN DIVERSITY

STATEMENT REGARDING PRIOR DISCLOSURE BY THE INVENTORS

Aspects of this technology are described in an article "Miniaturized Slot MIMO Antenna with Pattern Diversity for CubeSat Application" published in 2022 IEEE International Symposium on Antennas and Propagation and USNC-URSI Radio Science Meeting (AP-S/URSI), on Jul. 10-15, 2022, which is incorporated herein by reference in its entirety.

STATEMENT OF ACKNOWLEDGEMENT

The inventor(s) acknowledge the financial support provided by the King Fahd University of Petroleum and Minerals (KFUPM), Riyadh, Saudi Arabia, through Project #SR201009.

BACKGROUND

Technical Field

The present disclosure is directed to a CubeSat MIMO antenna design with pattern diversity, which operates in the range of 430 MHz to 510 MHz.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As defined herein, "pattern diversity" consists of two or more co-located antennas with different radiation patterns. This type of diversity makes use of directional antennas that are usually physically separated by some (often short) distance. Collectively they are capable of discriminating a large portion of angle space and can provide a higher gain versus a single omnidirectional radiator. In the present disclosure, four antennas are formed on a single substrate, each antenna having a different radiation pattern.

Satellite communication is a high-speed wireless communication technology with high capacity data transmission. Satellite communication involves transmission of signals from a ground station to a satellite and vice versa. Satellite communication provides communication services between two points on earth such as point-to-point services (e.g., internet, satellite phones) and point-to-multipoint (broadcast) services (e.g., television). Traditional satellite systems are encumbered by their relatively large physical size and complexity of operation. However, recent developments have led to smaller, lightweight, and simplified satellite systems, such as pico-class satellites or cube satellites (CubeSats). CubeSats are economical and easy to manufacture as compared to the conventional satellite systems. CubeSats are limited in size, thus there are challenging requirements for adding compact subsystems to CubeSats. For performing various functions, the CubeSat includes one or more transceiver antennas to support communications. In satellite systems, antenna design is a key component for both upstream and downstream communication that connects ground stations with satellites. The design of an antenna for the CubeSat has stringent limitations due to the size constraints that define its design space. A compact antenna is required while maintaining basic antenna characteristics, such as input impedance matching, bandwidth, and peak gain requirements.

Recently, a need for Multi-Input-Multi-Output (MIMO) antennas for the CubeSats operating in the ultra high frequency (UHF) band has increased. MIMO antennas are needed for uplink and downlink communications, and for inter-communication between the CubeSats. The MIMO antennas enhance throughput and diversity gain of the CubeSat operating in MIMO communication systems.

Both planar and non-planar antennas are suitable for the CubeSats at UHF band. Planar antennas are preferable as these can be readily integrated with other existing radio frequency (RF) and microwave circuits. Also, various patch antennas with planar geometry are also available to operate in UHF, L, S, C and X band. However, the larger size of these patch antennas is a major drawback. To operate in the UHF band, a conventional patch antenna, with a fractal structure having dimensions of 60 mm×26.3 mm, was developed (See: O. F. G. Palacios, R. E. D. Vargas, J. A. H. Perez, and S. B. C. Erazo, "*S-band Koch Snowflake Fractal Antenna for Cubesats*," in 2016 IEEE Andescon. IEEE, 2016, pp. 1-4, incorporated herein by reference in its entirety). However, the patch antenna failed to provide high gain. A slot antenna is considered a suitable option to achieve miniaturization of the antenna, along with wide bandwidth and higher gain. Conventional slot antenna designs for CubeSats in the UHF band suffer from disadvantages of linear polarization and low directivity. Further, a conventional small slot antenna was described that achieved a matched antenna with a fairly high efficiency for a given arbitrary small size. The miniaturization was achieved by terminating the short slot by an inductor. (See: R. Azadegan and K. Sarabandi, "*Design of Miniaturized Slot Antennas*," in IEEE Antennas and Propagation Society International Symposium. 2001 Digest. Held in conjunction with: USNC/URSI National Radio Science Meeting (Cat. No. 01CH37229), vol. 4. IEEE, 2001, pp. 565-568, is incorporated herein by reference in its entirety). The small slot antenna is subject to various limitations such as antenna bandwidth and gain/efficiency. The small slot antenna has a high gain of 12.45 dB, however it has a narrow bandwidth and larger size of 16×17×0.68 $cm^3$. To minimize the size of the antenna, folded-slot antennas have been employed. Folded-slot antennas are small in size, light in weight, easy to integrate, can be mass-produced easily, and can be made into various shapes. They have excellent compatibility with integrated circuits and have a wide operating bandwidth.

An existing microstrip-fed slot antenna was described that employed a parasitic coupling and an inductive loading to achieve higher BW and size reduction (See: N. Behdad and K. Sarabandi, "*Bandwidth Enhancement and Further Size Reduction of a Class of Miniaturized Slot Antennas*," IEEE Transactions on Antennas and Propagation, vol. 52, no. 8, pp. 1928-1935, 2004, incorporated herein by reference in its entirety).

Another existing miniaturized folded slot antenna was described. (See: IEEE Antennas and Propagation Society, "*Miniaturized Folded-Slot: An Approach To Increase The Bandwidth and Efficiency of Miniaturized Slot Antennas*," in IEEE Antennas and Propagation Society International Symposium (IEEE Cat. No. 02CH37313), vol. 4. IEEE, 2002, pp. 14-17, incorporated herein by reference in its entirety).

A two single fed low-profile cavity-backed planar slot antenna for circular polarization (CP) applications was described. (See: S. A. Razavi and M. H. Neshati, "*Development of a Low-Profile Circularly Polarized Cavity-Backed Antenna Using Hmsiw Technique*," IEEE Transactions on Antennas and Propagation, vol. 61, no. 3, pp. 1041-1047, 2012, is incorporated herein by reference in its entirety).

Another conventional design of miniaturized slot antennas was described that employed folded and self-complementary structures (See: R. Azadegan and K. Sarabandi "*Bandwidth Enhancement of Miniaturized Slot Antennas Using Folded, Complementary, and Self-Complementary Realizations*," IEEE transactions on antennas and propagation, vol. 55, no. 9, pp. 2435-2444, 2007, is incorporated herein by reference in its entirety). However, the systems and methods described in these references and other conventional antennas suffer from various limitations including linear polarization, low directivity, poor bandwidth and limited gain. Accordingly, there is a need for a CubeSat MIMO antenna that can provide enhanced radiation efficiency and enhanced bandwidth performance in the UHF band, which is compatible with the small size of CubeSats.

SUMMARY

In an exemplary embodiment, a four element folded slot-based multiple-input-multiple-output (MIMO) antenna for use on cubic shaped satellites (Cube-Sat) having dimensions of (about 50 mm to about 100 mm)×(about 50 to about 100 mm)×(about 50 to about 100 mm) is described. The four element folded slot-based MIMO antenna includes a dielectric circuit board having a surface dimension in the ranges of about 50 mm to 100 mm in length by about 50 mm to 100 mm in width, a top side, a bottom side, a first edge opposite a second edge, and a third edge opposite a fourth edge, a metallic layer configured to cover a top side of the dielectric circuit board, wrap around the first edge and the second edge and cover a first portion of the bottom side and a second portion of the bottom side, a first meandering slot located in the metallic layer, wherein the first meandering slot is configured to wrap from the top side, over the first edge, and into the first portion on the bottom side, a second meandering slot located in the metallic layer, wherein the second meandering slot is configured to wrap from the top side, over the second edge and into the second portion of the bottom side, a first feed horn located in a gap portion between the first portion and the second portion of the bottom side, wherein a feed line of the first feed horn extends from the third edge, and wherein the first feed horn is directed towards the first meandering slot, a second feed horn located in the gap portion, wherein a feed line of the second feed horn extends from the fourth edge, and wherein the second feed horn is directed towards the second meandering slot, a first capacitor connected to the metallic layer across a slot section of the first meandering slot, and a second capacitor connected to the metallic layer across a slot section of the second meandering slot.

In another exemplary embodiment, a method of forming a four element folded slot-based multiple-input-multiple-output (MIMO) antenna for use on cubic shaped satellites (Cube-Sat) having dimensions of (about 50 mm to about 100 mm)×(about 50 to about 100 mm)×(about 50 to about 100 mm) is described. The method incudes obtaining a dielectric circuit board having a surface dimension of about 50 mm to about 100 mm in length by about 50 mm to about 100 mm in width, a top side, a bottom side, a first edge opposite a second edge, and a third edge opposite a fourth edge. The method incudes covering the dielectric circuit board with a metallic layer. The method incudes etching, by laser milling, a gap portion between a first portion and a second portion of the bottom side. The method further incudes etching, by laser milling, a first meandering slot located in the metallic layer, wherein the first meandering slot is configured to wrap from the top side, over the first edge, and into the first portion on the bottom side. The method further incudes etching, by laser milling, a second meandering slot located in the metallic layer, wherein the second meandering slot is configured to wrap from the top side, over the second edge and into the second portion of the bottom side. The method further incudes depositing a first metallic feed line in the gap portion, wherein the first metallic feed line extends from the third edge towards the fourth edge. The method further incudes connecting a first feed horn to the first metallic feed line such that an opening of the first feed horn is directed towards the first meandering slot. The method further incudes depositing a second metallic feed line in the gap portion, wherein the second metallic feed line extends from the fourth edge towards the third edge. The method further incudes connecting a second feed horn to the second metallic feed line such that an opening of the second feed horn is directed towards the second meandering slot. The method further incudes connecting a first capacitor to the metallic layer across a slot section of the first meandering slot. The method further incudes connecting a second capacitor to the metallic layer across a slot section of the second meandering slot.

In another exemplary embodiment, a method for transmitting and receiving ultra high frequency (UHF) signals with a four element folded slot-based multiple-input-multiple-output (MIMO) antenna is described. The method incudes obtaining a dielectric circuit board having a surface dimension of about 50 mm to about 100 mm in length by about 50 mm to about 100 mm in width, a top side, a bottom side, a first edge opposite a second edge, and a third edge opposite a fourth edge. The method incudes covering the dielectric circuit board with a metallic layer. The method incudes etching, by laser milling, a gap portion between a first portion and a second portion of the bottom side. The method incudes forming, by laser etching, a first meandering slot and a second meandering slot in the metallic layer which delineate a first antenna element, a second antenna element, a third antenna element and a fourth antenna element. The method further incudes depositing a first metallic feed line in the gap portion, wherein the first metallic feed line extends from the third edge towards the fourth edge. The method further incudes connecting a first feed horn to the first metallic feed line such that an opening of the first feed horn is directed towards the first antenna element and the third antenna element. The method further incudes depositing a second metallic feed line in the gap portion, wherein the second metallic feed line extends from the fourth edge towards the third edge. The method further incudes connecting a second feed horn to the second metallic feed line such that an opening of the second feed horn is directed towards the second antenna element and the fourth antenna element. The method further incudes connecting a first capacitor to the metallic layer across a slot section of the first meandering slot. The method further incudes connecting a second capacitor to the metallic layer across a slot section of the second meandering slot. The method further incudes applying a plurality of signal frequencies to the first feed line and the second feed line. The method further incudes resonating the four element folded slot-based MIMO antenna at ultra high frequencies in the range of 430 MHz to 510 MHz, wherein: the first antenna element is configured to resonate at signal frequencies in a first direction, the second antenna element is configured to resonate at signal frequencies in a second direction orthogonal to the first direction, the third antenna element is configured to resonate at signal frequencies in a third direction orthogonal to the first direction and the second direction, and the fourth antenna element is configured to resonate at signal frequencies in a fourth direction orthogonal to the first direction, the second direction and the third direction.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 7A is an exemplary illustration of 3-D gain pattern of the first antenna at 450 MHZ, according to certain embodiments.

FIG. 7B is an exemplary illustration of 3-D gain pattern of the second antenna at 450 MHz, according to certain embodiments.

FIG. 7C is an exemplary illustration of 3-D gain pattern of the third antenna at 450 MHZ, according to certain embodiments.

FIG. 7D is an exemplary illustration of 3-D gain pattern of the fourth antenna at 450 MHz, according to certain embodiments.

DETAILED DESCRIPTION

Figure 1A:
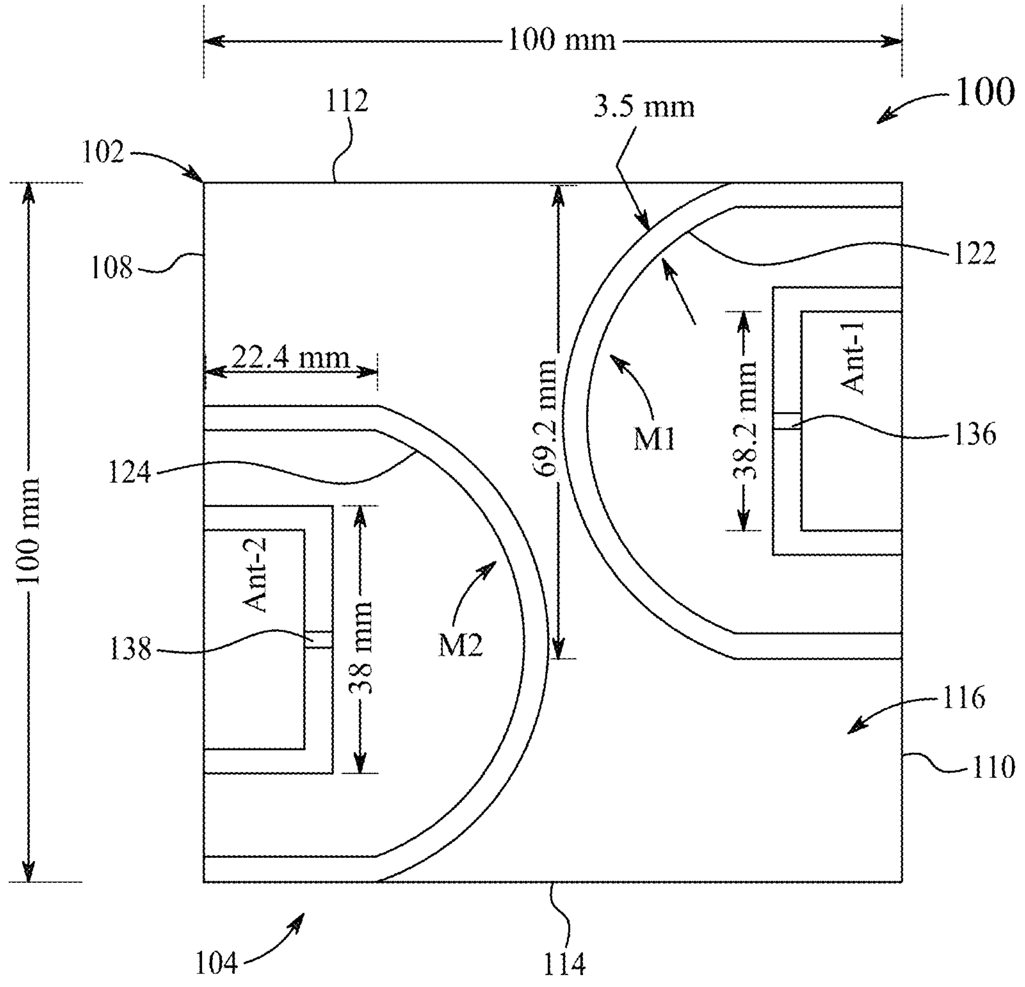
FIG. 1A is a top view of a four element folded slot-based multiple-input-multiple-output (MIMO) antenna, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a four (4)-element folded slot-based multiple-input-multiple-output (MIMO) antenna for use on cubic shaped satellites (CubeSats). The present disclosure describes a highly miniaturized folded slot-based MIMO antenna with pattern diversity. CubeSats are built to standard dimensions (Units or "U") of 10 cm×10 cm×10 cm. They can be 1 U, 2 U, 3 U, or 6 U in size, and typically weigh less than 1.33 kg (3 lbs) per U. The 4-element folded slot-based MIMO antenna of the present disclosure is intended for a CubeSat. In a MIMO antenna, antenna miniaturization is achieved by folding the meandering slot-line and by adding capacitive loading. The four-element folded slot-based MIMO antenna is characterized by its planar geometry, wide-band operation, pattern diversity, and extremely down-sized structure. In an aspect, each folded meandering slot is about 50×68 $mm^2$ in size and operates in a frequency range of 430-510 MHZ.

Small satellites, i.e., CubeSats, have a promising future in the field of satellite communication as they are quickly enabled and easily affordable for technological demonstration, scientific study, and educational space programs. A standard size of the 1 U of CubeSat is about 100×100×100 $mm^3$. A plurality of 1U CubeSat antennas may be easily assembled to generate a larger size antenna of up to 12 U. CubeSats are capable of performing all of the basic operations of conventional satellites including altitude monitoring and control, and uplink and downlink communications. The energy requirement of the CubeSat is met by a battery unit and a plurality of solar panels, which are installed on the body of the CubeSat.

In various aspects of the disclosure, definitions of one or more terms that will be used in the document are provided below.

The term "decibel (or dB)" is a unit used to compare the ratio of input power to the output power. The decibel reflects the intensity of the power level of an electrical signal by comparing it to a given scale. One decibel equals 10 times the common logarithm of the power ratio. For example, an amplifier causes a gain in power measured in decibels and it is indicated by a positive number. In another example, cables can cause a loss of power. This is measured in negative dB.

The term "dBi" is defined as the forward gain of an antenna system relative to an isotropic radiator at radio frequencies. The term dBi is an abbreviation for "decibels relative to isotropic". Antenna manufacturers use dBi to measure antenna performance.

FIG. 1A-FIG. 1B and FIG. 2A-FIG. 2F illustrate the overall configuration of a four element folded slot-based multiple-input-multiple-output (MIMO) antenna.

Figure 1B:
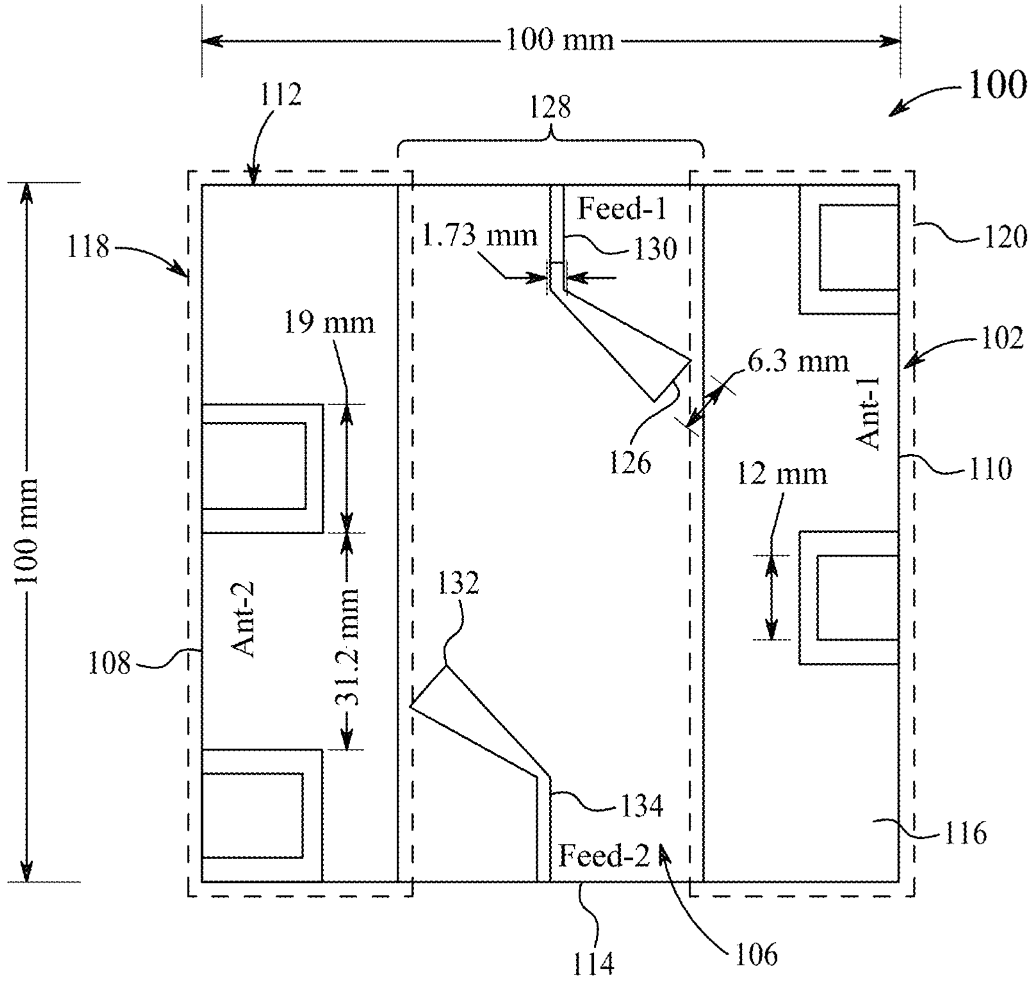
FIG. 1B is a bottom view of the four element folded slot-based MIMO antenna, according to certain embodiments.

FIG. 1A is a top view (front side) of an embodiment of the four element folded slot-based MIMO antenna 100, (hereinafter interchangeably referred to as "the MIMO antenna 100"), according to one or more aspects of the present disclosure. FIG. 1B is a bottom view (back side) of the MIMO antenna 100, according to certain embodiments. FIG. 1A-FIG. 1B may be viewed in conjunction with FIG. 2A-FIG. 2F for better understanding. In an aspect, the MIMO antenna 100 is configured to be used on the cubic shaped satellite (Cube-Sat) having dimensions in the ranges of (50 mm to 100 mm)×(50 mm to 100 mm)×(50 mm to 100 mm). In the drawings of FIG. 1A-FIG. 1B, and FIG. 2A-FIG. 2F, the dimensions shown are for the example of a 100×100 $mm^2$ circuit board and should not be construed as limiting. For a circuit board less than 100×100 $mm^2$, the dimensions are proportionately smaller.

As shown in FIG. 1A and FIG. 1B, the MIMO antenna 100 includes a dielectric circuit board 102, a metallic layer 116, a first meandering slot M1, a second meandering slot M2, a first feed horn 126, a second feed horn 132, a first capacitor 136 and a second capacitor 138.

The dielectric circuit board 102 has a surface dimension of 50 mm to 100 mm in length and 50 mm to 100 mm in width. The dielectric circuit board 102 has a top side 104, a bottom side 106, a first edge 108, a second edge 110, a third edge 112, and a fourth edge 114. The first edge 108 is opposite to the second edge 110. The third edge 112 is opposite to the fourth edge 114. A length dimension is defined as a distance from the first edge to the second edge. A width dimension is defined as a distance from the third edge to the fourth edge. A thickness (or depth) dimension is defined as a distance from the top side to the bottom side along a line perpendicular to the surface of the top side. In an example, the dielectric circuit board 102 is a Rogers RO4350 substrate (fabricated by Rogers Corporation, located at 2225 W Chandler Blvd, Chandler, Arizona, United States of America). In an example, the dielectric circuit board 102 has a 1.6 mm thickness. In an example, the dielectric circuit board 102 uses a substrate material having a relative permittivity ($\varepsilon_r$) of 3.48 and loss tangent of 0.0036.

The metallic layer 116 is configured to cover the top side 104 of the dielectric circuit board 102. The metallic layer 116 wraps around the first edge 108 of the dielectric circuit board 102 and covers a first portion 118 of the bottom side 106. In an aspect, the first portion 118 is configured to extend from the first edge 108 to about one fourth of the length of the bottom side 106 of the dielectric circuit board 102. The metallic layer 116 wraps the dielectric circuit board 102 around the second edge 110 and covers a second portion 120 of the bottom side 106. In an aspect, the second portion 120 is configured to extend from the second edge 110 to about one-fourth of the length of the bottom side 106 of the dielectric circuit board 102. In an aspect, a gap portion 128 remains between the first portion 118 and the second portion 120. The gap portion 128 covers about one half of the length of the bottom side 106 of the dielectric circuit board 102.

In the metallic layer 116, two meandering slot lines (M1, M2) are formed. For example, the meandering slot lines (M1, M2) are fabricated on the metallic layer 116 using a printed circuit board (PCB) laser etching and milling machine (using for example, LPKF Prototyping machine manufactured by LPKF Laser & Electronics, located at Osteriede 7, 30827 Garbsen, Germany). In an aspect, each meandering slot line (M1, M2) has a width of 3.5 mm. In an aspect, the semicircular arch has a diameter of 69.2 mm. The first meandering slot M1 is located in the metallic layer 116. The first meandering slot M1 is configured to wrap from the top side 104, over the first edge 108, and into the first portion 118 on the bottom side 106. In an aspect, the first meandering slot M1 is configured to form a first antenna element (ant-1) and a third antenna element (ant-3).

The second meandering slot M2 is configured to wrap from the top side 104, over the second edge 110, and into the second portion 120 of the bottom side 106. In an aspect, the second meandering slot M2 is configured to form a second antenna element (ant-2) and a fourth antenna element (ant-4).

Each antenna element may act as a transmitting antenna or as a receiving antenna. In some aspects, the first antenna element (ant-1) may act as the transmitting antenna, and the third antenna element (ant-3) may act as the receiving antenna. In an example, the second antenna element (ant-2) may act as the transmitting antenna, and the fourth antenna element (ant-4) may act as the receiving antenna. In some examples, each antenna element may act as the transmitting antenna as well as the receiving antenna.

The first capacitor 136 is connected to the metallic layer 116 across a slot section of the first meandering slot M1, thus the first capacitor 136 bridges the slot-line. The first antenna element (ant-1) and the third antenna element (ant-3) are configured to resonate at a signal frequency selected from a group of signal frequencies. For example, the signal frequencies are dependent on a value of capacitance of the first capacitor 136. By varying the capacitance value of the first capacitor 136, the signal frequency may be changed, and as a result, the first antenna element (ant-1) and the third antenna element (ant-3) can be tuned to different signal frequencies.

The second capacitor 138 is connected to the metallic layer 116 across a slot section of the second meandering slot M2. The second antenna element (ant-2) and a fourth antenna element (ant-4) are configured to resonate at a signal frequency selected from a group of signal frequencies. For example, the signal frequencies are dependent on a value of capacitance of the second capacitor 138. By varying the capacitance value of the second capacitor 138, the signal frequency may be changed, and as a result, the second antenna element (ant-2) and the fourth antenna element (ant-4) can be tuned to different signal frequencies.

The first feed horn 126 is located in the gap portion 128 between the first portion 118 and the second portion 120 of the bottom side 106. The second feed horn 132 is also located in the gap portion 128. Each feed horn is configured to couple a waveguide to, for example, a parabolic dish antenna or offset dish antenna for reception or transmission of microwave signals. The feed horn minimizes the mismatch loss between the antenna and the waveguide. In an example, the feed horn is a separate part configured to be attached to the MIMO antenna 100 during installation. In some examples, the feed horn is prefabricated/integrated with the MIMO antenna 100.

As shown in FIG. 1B, the first feed horn 126 includes a first feed line 130, a first feed end, and a first horn end. The first feed line 130 is connected to the third edge 112 in the gap portion 128. The first feed end of the first feed horn 126 is connected to the first feed line 130. In some examples, the first feed line 130 has a width of 1.73 mm. In another example, the first horn end has a width of 6.3 mm. The first feed horn 126 is directed towards the first meandering slot M1. In an aspect, the first feed line 130 is configured to receive a plurality of signal frequencies and supply the plurality of signal frequencies to the first feed horn 126.

The second feed horn 132 includes a second feed line 134, a second feed end, and a second horn end. In an aspect, the second feed line 134 of the second feed horn 132 extends from the fourth edge 114. In some examples, the second feed line 134 has a width of 1.73 mm. In another example, the second horn end has a width of 6.3 mm. The second feed horn 132 is directed towards the second meandering slot M2. In an aspect, the second feed line 134 are configured to receive a plurality of signal frequencies and supply the plurality of signal frequencies to the second feed horn 132.

In an aspect, the four element folded slot-based MIMO antenna 100 is configured to resonate at signal frequencies in the range of 430 MHz to 510 MHz.

Figure 2A:
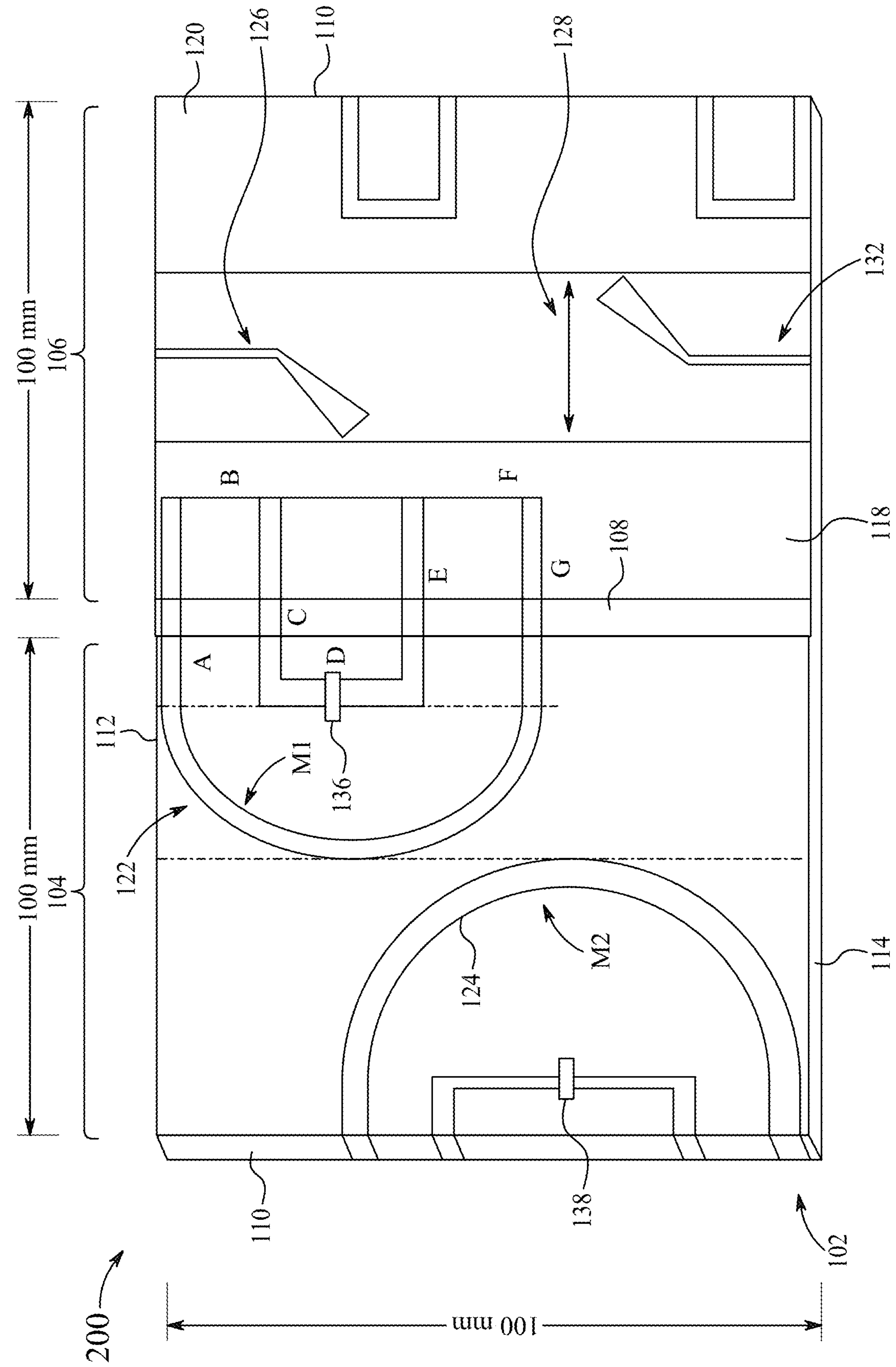
FIG. 2A is a schematic diagram of an unfolded state of the four element folded slot-based MIMO antenna, according to certain embodiments.

FIG. 2A is a schematic diagram 200 of an unfolded state of the four element folded slot-based MIMO antenna 100, according to certain embodiments. As shown in FIG. 2A to FIG. 2D, the MIMO antenna 100 includes the first antenna element (ant-1), the second antenna element (ant-2), the third antenna element (ant-3), and the fourth antenna element (ant-4). The first meandering slot M1 includes a semicircular arch 122 and a plurality of connected legs (A-G). For example, the plurality of connected legs include seven legs (A-G) having a first leg (A), a second leg (B), a third leg (C), a fourth leg (D), a fifth leg (E), a sixth leg (F), and a seventh leg (G).

The semicircular arch 122 is located on the top side 104 of the dielectric circuit board 102. The semicircular arch 122 extends to about two-thirds of the width of the dielectric circuit board 102 from the third edge 112 towards the fourth edge 114. In an aspect, an apex of the semicircular arch 122 is located halfway between the second edge 110 and the first edge 108. The semicircular arch 122 is configured to open towards the first edge 108.

The first leg (A) is perpendicular to a base of the semicircular arch 122. The first leg (A) is connected to the base of the semicircular arch 122 at an outer end of the semicircular arch 122 near the third edge 112. The first leg (A) extends from the top side 104 of the dielectric circuit board 102, over the first edge 108, and through about two-thirds of a length of the first portion 118.

Figure 2B:
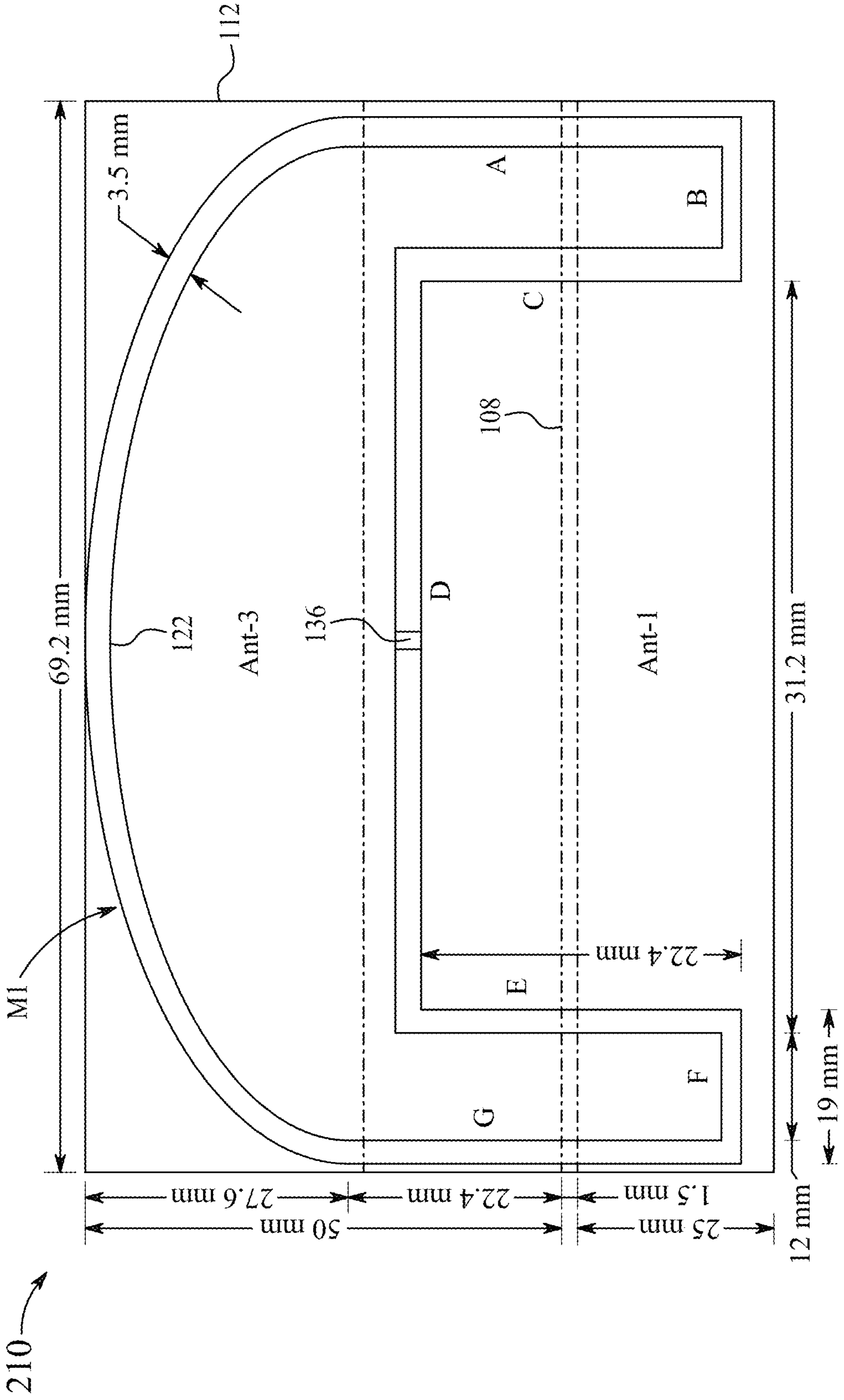
FIG. 2B is a schematic diagram of an unfolded state of a first meandering slot M1 having a first antenna element and a third antenna element, according to certain embodiments.

As shown in FIG. 2B, the second leg (B) is connected perpendicularly to the first leg (A). In an aspect, an outer width of the second leg (B) is about one-fifth of the width of the dielectric circuit board 102.

The third leg (C) is connected perpendicularly to the second leg (B) and parallel to the first leg A. The third leg (C) extends from the second leg (B), through the first portion 118, over the first edge 108, to about one-fourth of the length of the top side 104 of the dielectric circuit board 102.

The fourth leg (D) is connected perpendicularly to the third leg (C). The fourth leg (D) extends parallel to the base of the semicircular arch 122 for a distance equal to about one third of the width of the dielectric circuit board 102 and towards the fourth edge 114.

The fifth leg (E) is connected perpendicularly to the fourth leg (D). The fifth leg (E) is configured to extend from the top side 104, over the first edge 108, and through two thirds of the length of the first portion 118.

The sixth leg (F) is connected perpendicularly to the fifth leg (E). The sixth leg (F) is configured to extend from the fifth leg (E) towards the fourth edge 114, wherein an outer width of the sixth leg (F) is about one fifth of the width of the dielectric circuit board 102.

The seventh leg (G) is connected perpendicularly to the sixth leg (F). The seventh leg (G) is configured to extend from the sixth leg (F), through the first portion 118, over the first edge 108, and connect to a meandering slot section at an inner end of the base of the semicircular arch 122.

As shown in FIG. 2A, the first antenna element (ant-1) is formed by a metallic area enclosed by the third leg (C), the fourth leg (D) and the fifth leg (E) of the first meandering slot M1. In an aspect, the first antenna element (ant-1) is configured to resonate at signal frequencies in the range of 430 MHz to 510 MHz in a first direction.

The third antenna element (ant-3) is formed in a metallic area on the top side 104 enclosed by the semicircular arch 122 and the fourth leg (D), and on the top side 104 and the bottom side 106 between the first leg (A) and the third leg (C), and between the fifth leg (E) and the seventh leg (G) of the first meandering slot M1. In an aspect, the third antenna element (ant-3) is configured to resonate at signal frequencies in the range of 430 MHz to 510 MHz in a third direction orthogonal to the first direction and a second direction.

In an aspect, an opening of the first feed horn 126 is directed towards the first antenna element (ant-1) and the third antenna element (ant-3). The first feed horn 126 is configured to radiate the plurality of signal frequencies towards the first antenna element (ant-1) and the third antenna element (ant-3).

In an aspect, the first capacitor 136 is connected across a center of the fourth leg (D) of the first meandering slot M1. In an example, a value of the first capacitor 136 is selected in the range of zero to 12 pF. For example, the value of the first capacitor 136 is 8 pF.

FIG. 2B is a schematic diagram 210 of an unfolded state of the first meandering slot M1 having the first antenna element (ant-1) and the third antenna element (ant-3), according to certain embodiments. The construction of first meandering slot M1 as shown in FIG. 2B is substantially similar to that of FIG. 2A, and thus the construction is not repeated here in detail for the sake of brevity. For the example of the 100×100 $mm^2$ dielectric circuit board 102, as shown in FIG. 2B, the inner length of the sixth leg (F) is 12 mm and the outer length of the sixth leg (F) is 19 mm. In this aspect, the inner length of the fourth leg (D) is 31.2 mm and the outer length of the fifth leg (E) is 22.4 mm. In this aspect, the width of each semicircular arch is 69.2 mm.

Figure 2C:
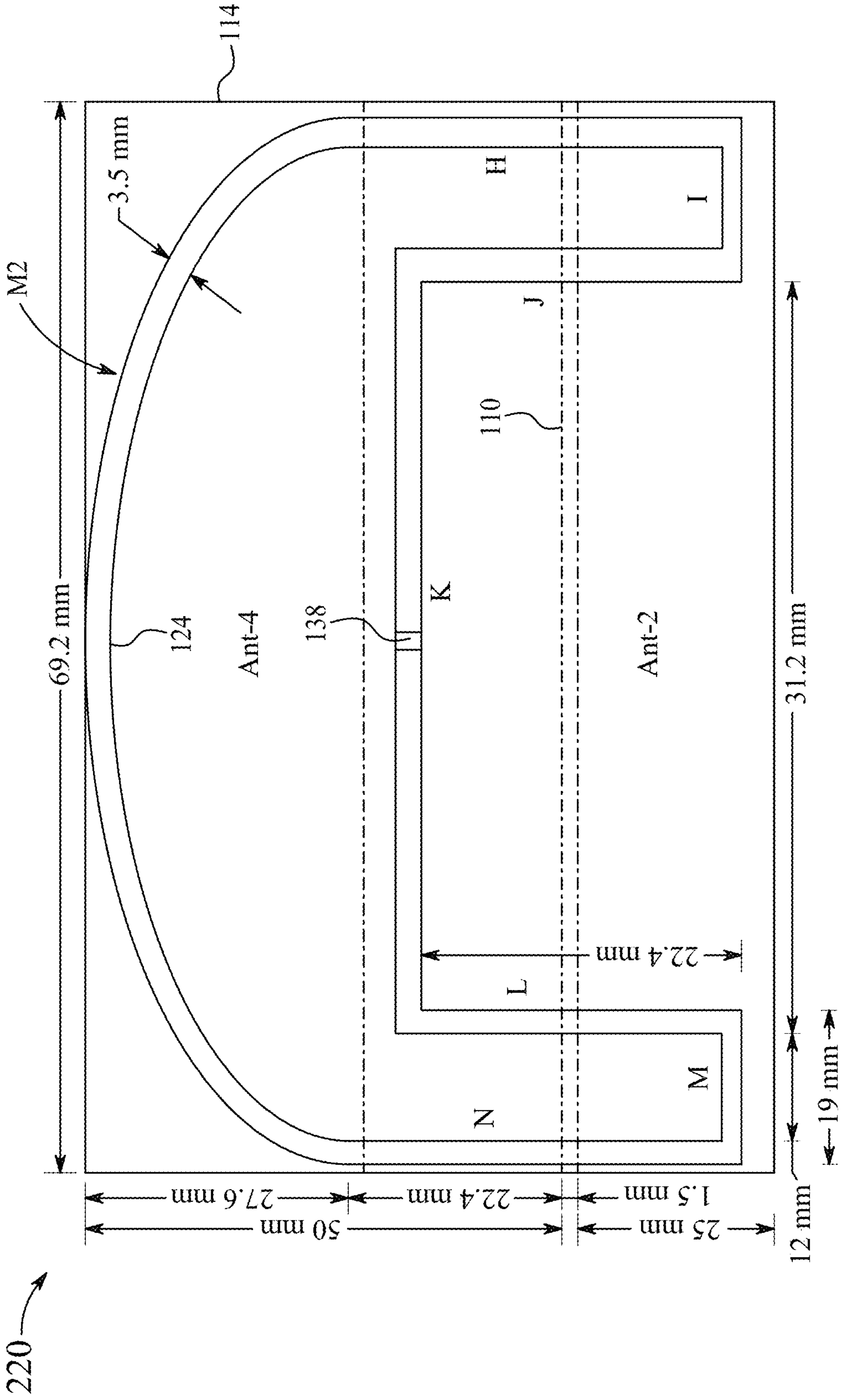
FIG. 2C is a schematic diagram of an unfolded state of a second meandering slot M2 having a second antenna element and a fourth antenna element, according to certain embodiments.

FIG. 2C is a schematic diagram 220 of an unfolded state of a second meandering slot M2 having the second antenna element (ant-2) and the fourth antenna element (ant-4), according to certain embodiments. As shown in FIG. 2C, the second meandering slot M2 includes a semicircular arch 124 and a plurality of connected legs. For example, the plurality of connected legs includes seven legs (H-N) having a first leg (H), a second leg (I), a third leg (J), a fourth leg (K), a fifth leg (L), a sixth leg (M), and a seventh leg (N).

The semicircular arch 124 is located on the top side 104. The semicircular arch 124 extends to about two-thirds of the width of the dielectric circuit board 102 from the fourth edge 114 towards the third edge 112. In an aspect, an apex of the semicircular arch 124 is located about halfway between the second edge 110 and the first edge 108. The semicircular arch 124 is configured to open towards the second edge 110.

The first leg (H) is perpendicularly connected to a base of the semicircular arch 124 at an outer end of the semicircular arch 124 near the fourth edge 114. The first leg (H) extends from the top side 104, over the second edge 110, and through about two-thirds of a length of the second portion 120.

The second leg (I) is perpendicularly connected to the first leg (H). In an aspect, an outer width of the second leg (I) is about one-fifth of the width of the dielectric circuit board 102. The second leg (I) extends from the fourth edge 114 towards the third edge (J).

The third leg (J) is perpendicularly connected to the second leg (I). The third leg (J) extends from the second leg (I), through the second portion 120, over the second edge 110, to about one-fourth of the length of the top side 104 of the dielectric circuit board 102.

The fourth leg (K) is perpendicularly connected to the third leg (J). In an aspect, the fourth leg (K) extends parallel to the base of the semicircular arch 124 for a distance equal to about one-third of the width of the dielectric circuit board 102 and towards the third edge 112. The fifth leg (L) is perpendicularly connected to the fourth leg (K). The fifth leg (L) extends from the top side 104, over the second edge 110, and through about two-thirds of the length of the second portion 120.

The sixth leg (M) is perpendicularly connected to the fifth leg (L). The sixth leg (M) extends from the fifth leg (L) towards the third edge 112. In an aspect, an outer width of the sixth leg (M) is about one-fifth of the width of the dielectric circuit board 102.

The seventh leg (N) is perpendicularly connected to the sixth leg (M). The seventh leg (N) extends from the sixth leg (M), through the second portion 120, over the second edge 110, and connects to a meandering slot section at an inner end of the base of the semicircular arch 124.

For the example of the 100×100 $mm^2$ dielectric circuit board 102, as shown in FIG. 2C, the inner length of the sixth leg (M) is 12 mm. In this example, the outer length of the sixth leg (M) is 19 mm. In an aspect, the inner length of the fourth leg (K) is 31.2 mm and the outer length of the fourth leg (K) is 38.2 mm. In this example, the outer length of the fifth leg (L) is 22.4 mm.

The second antenna element (ant-2) is formed by a metallic area enclosed by the third leg (J), the fourth leg (K) and the fifth leg (L) of the second meandering slot M2. In an aspect, the second antenna element (ant-2) is configured to resonate at signal frequencies in the range of 430 MHz to 510 MHz in the second direction orthogonal to the first direction.

The fourth antenna element (ant-4) is formed in a metallic area on the top side 104 enclosed by the semicircular arch 124 and the fourth leg (K), and on the top side 104 and the bottom side 106 between the first leg (H) and the third leg (J), and between the fifth leg (L) and the seventh leg (N) of the second meandering slot M2. In an aspect, the fourth antenna element (ant-4) is configured to resonate at signal frequencies in the range of 430 MHz to 510 MHz in a fourth direction orthogonal to the first direction, the second direction and the third direction.

In an aspect, an opening of the second feed horn 132 is directed towards the second antenna element (ant-2) and the fourth antenna element (ant-4). The second feed horn 132 is configured to radiate the plurality of signal frequencies towards the second antenna element (ant-2) and the fourth antenna element (ant-4).

The second capacitor 138 is connected across a center of the fourth leg (K) of the second meandering slot M2. In an example, a value of the second capacitor 138 is selected from the range of zero to 12 pF. For example, the value of the second capacitor 138 is 8 pF.

In an operative aspect, the four element folded slot-based MIMO antenna 100 is configured to resonate at ultra-high frequencies.

Figure 2D:
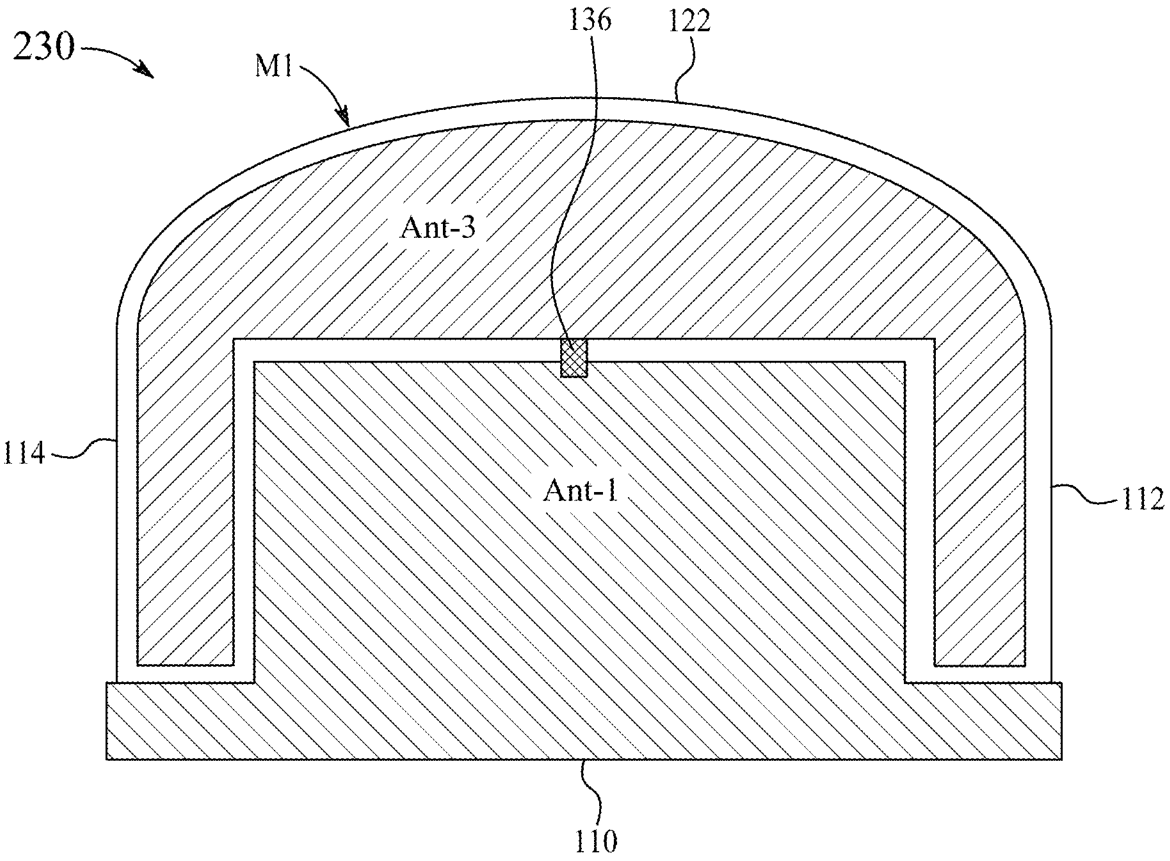
FIG. 2D is a top view of the unfolded second meandering slot M1, according to certain embodiments.

FIG. 2D is a top view 230 of the unfolded first meandering slot M1 having the first antenna element (ant-1) and the third antenna element (ant-3), according to certain embodiments. The construction of first meandering slot M1 as shown in FIG. 2B is substantially similar to that of FIG. 2B, and thus the construction is not repeated here in detail for the sake of brevity.

Figure 3A:
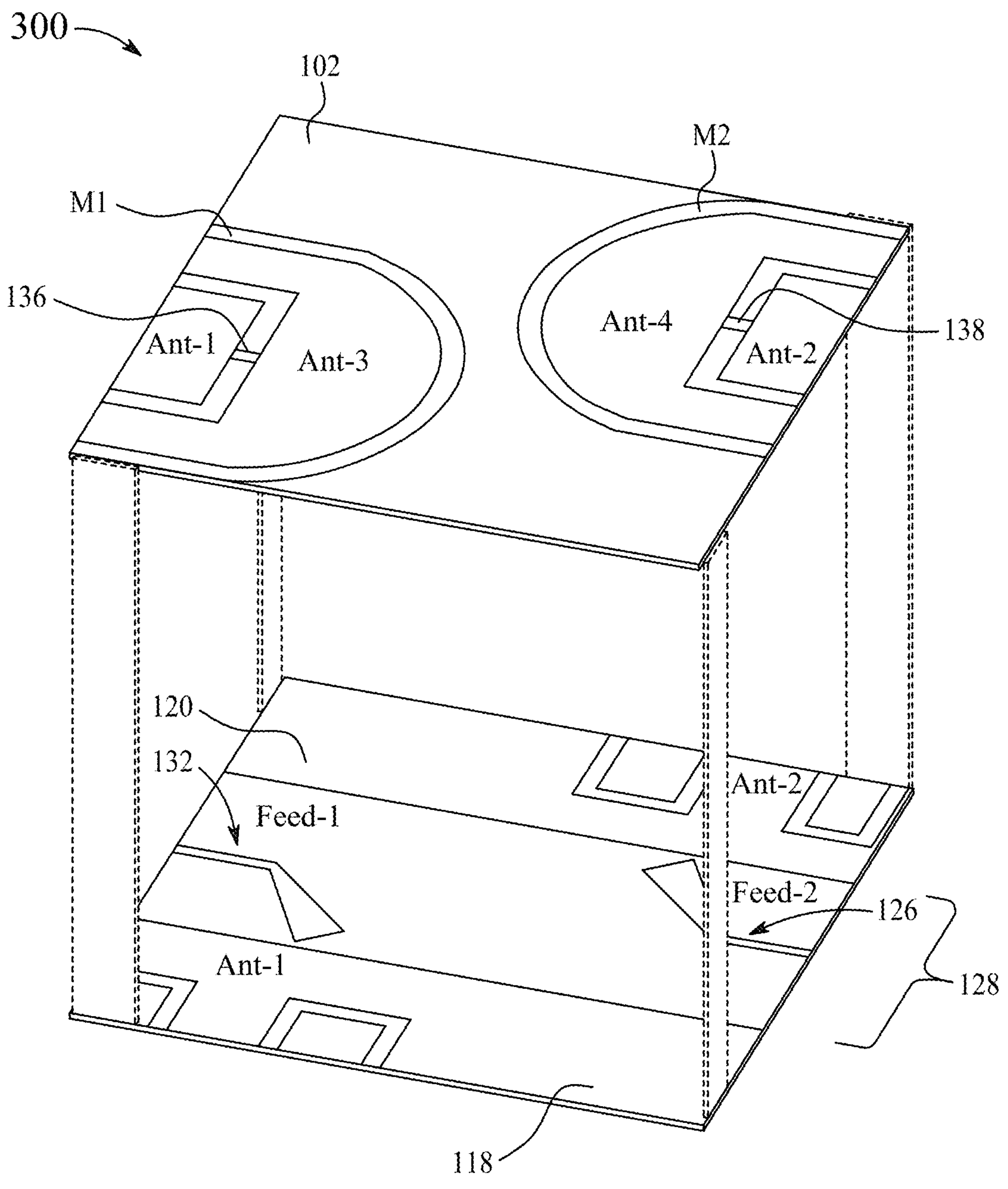
FIG. 3A is an exemplary illustration of a top view and bottom view of the four element folded slot-based MIMO antenna, according to certain embodiments.

FIG. 3A is an exemplary illustration 300 of a top view and a bottom view of the four element folded slot-based MIMO antenna 100, according to certain embodiments. The four element folded slot-based MIMO antenna 100 is designed to achieve a reduced sized antenna with planar geometry, wide-band operation and pattern diversity in a MIMO configuration. The folded meandering slots aid in a creation of avery compact and extremely reduced sized antenna, allowing for the addition of a second antenna element in a MIMO configuration.

By extending the slot to the opposite side of the dielectric circuit board 102, the meandering slots on the shorting wall may be used to extend the electrical length. The dimensions of the antenna are greatly reduced by the use of the folded structure (meandering slots). To further reduce the antenna size, each meandering slot is reactively loaded with a capacitor. Thus, a feeding mechanism and combination of folded structure with a capacitive loading help to achieve a compact MIMO antenna 100 with pattern diversity in UHF band.

Figure 3B:
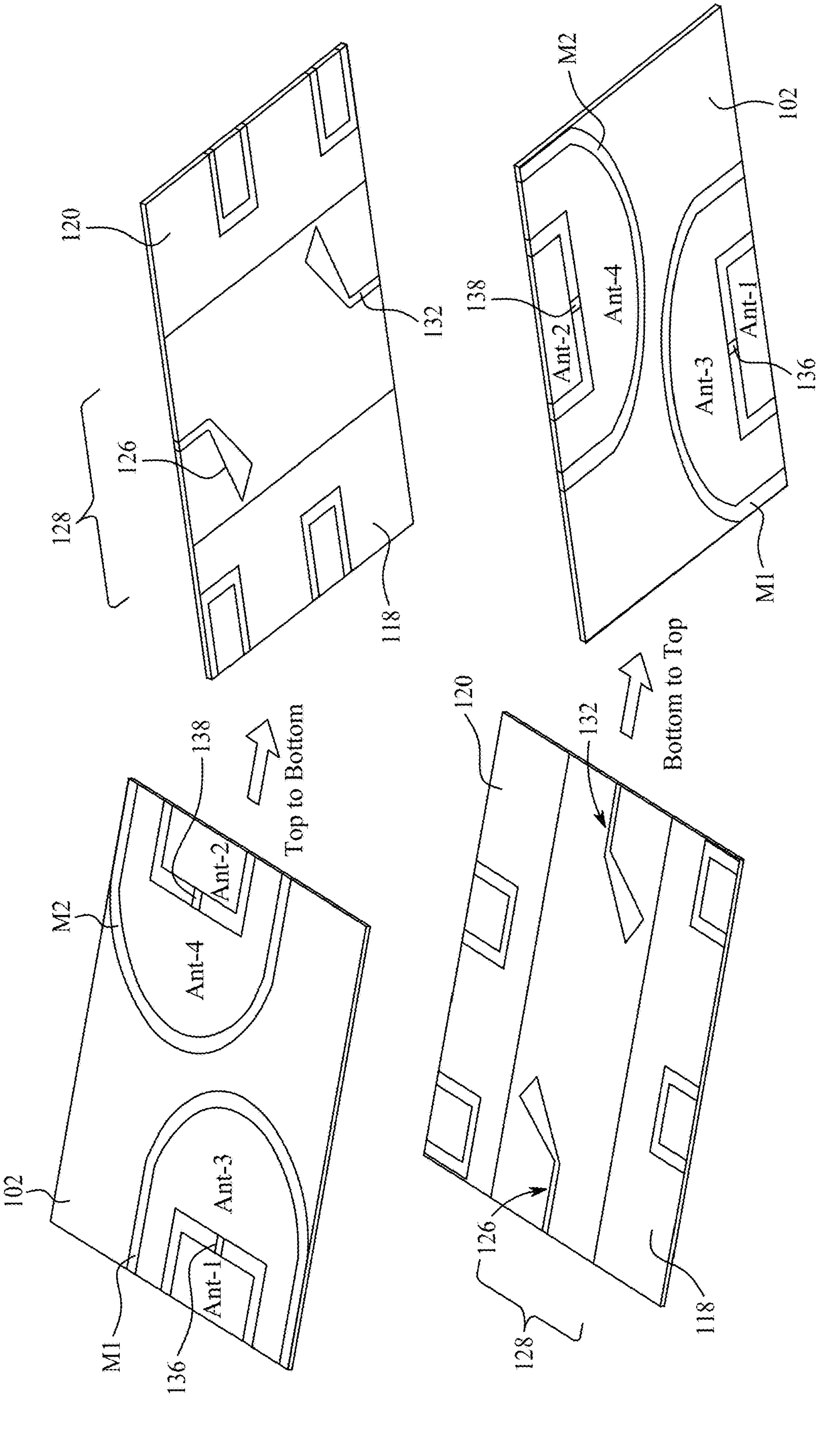
FIG. 3B is an illustration of the top and bottom views shown from different viewpoints, according to certain embodiments.

FIG. 3B illustrates the top surface flipped to show the bottom surface, and conversely the bottom surface flipped to show the top surface.

The following experiments were conducted on the MIMO antenna 100.

During experimentation, the MIMO antenna 100 was stimulated using an HFSS (High Frequency Structure Simulator). The MIMO antenna 100 was fabricated using a laser milling machine (for example, the LPKF S104, manufactured by LPKF Laser & Electronics, located at Osteriede 7, 30827 Garbsen, Germany). The fabricated MIMO antenna 100 was characterized for S-parameters using vector network analyzer (for example, the Agilent FieldFox RF Vector Network Analyzer manufactured by Agilent Technologies, Inc., located at 5301 Stevens Creek Blvd. Santa Clara, CA, United States of America). The MIMO antenna 100 was a reactively loaded meandering folded slot structure as described with respect to FIG. 1A to FIG. 2F.

Figure 4A:
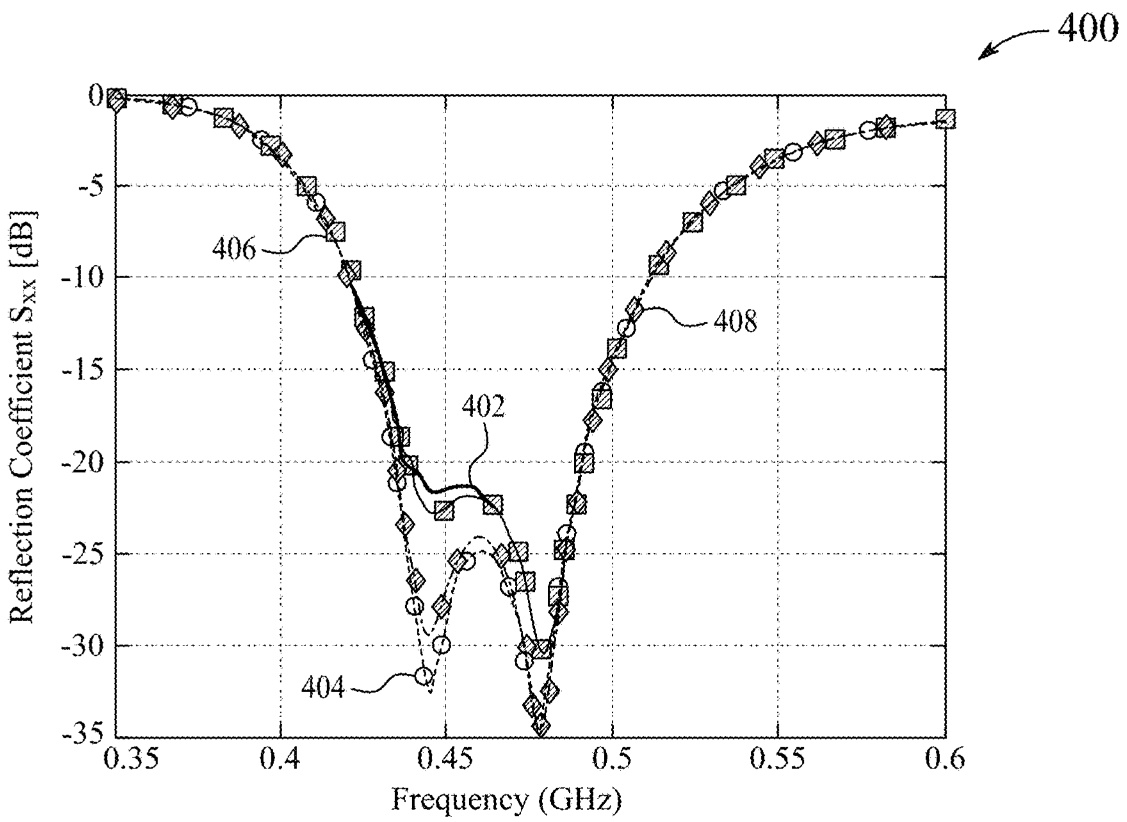
FIG. 4A is an exemplary illustration of simulated s-parameters ($S_{xx}$) results, according to certain embodiments.

FIG. 4A is an illustration 400 of the simulated scattering (s)-parameters ($S_{xx}$), x=1, 2, 3, 4, results without capacitive loading. The S-parameters describe the input-output relationship between ports (or terminals) in an electrical system. Su represents how much power is reflected from the antenna, and hence is known as the reflection coefficient. If $S_{11}$=0 dB, then all the power is reflected from the antenna, and nothing is radiated. Signal 402 represents the simulated values of the s-parameters ($S_{11}$). Further, signal 404 represents the simulated values of $S_{22}$. Signal 406 represents the simulated values of s-parameters ($S_{33}$). Signal 408 represents the simulated values of $S_{44}$. The MIMO antenna 100 may be tuned at other lower frequency bands by changing the capacitance values.

Figure 4B:
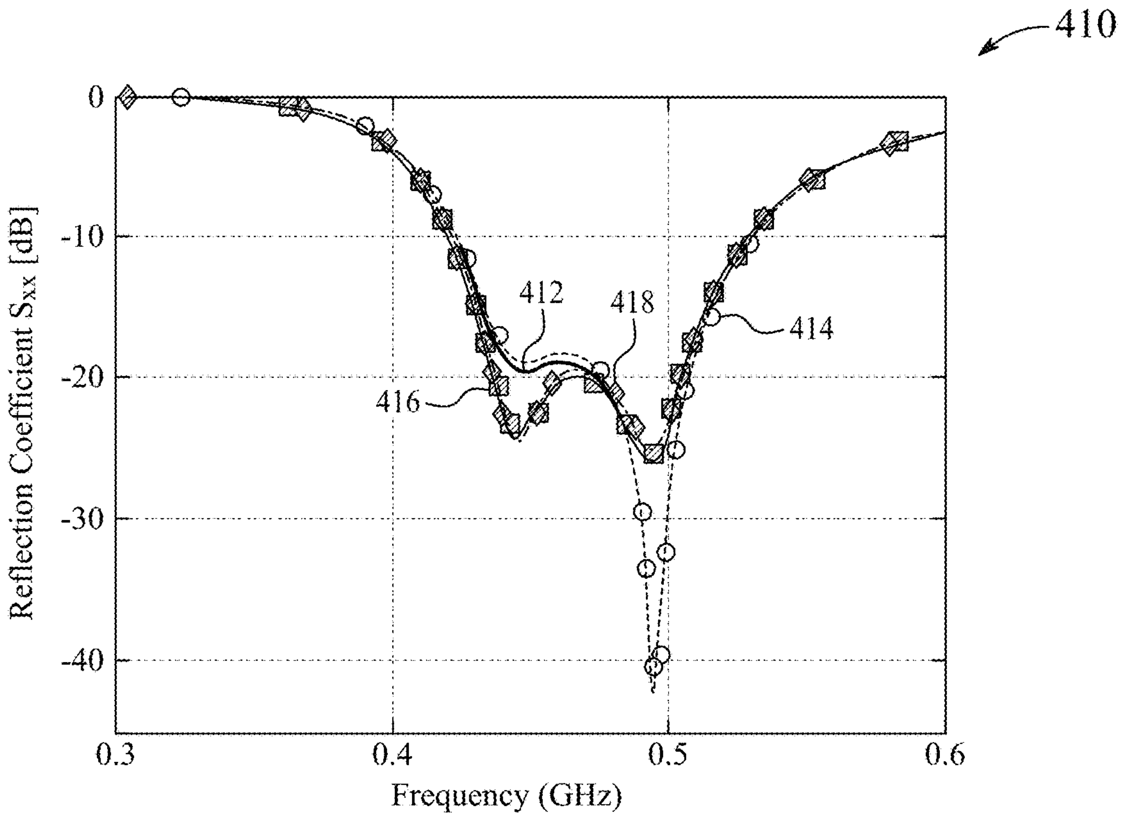
FIG. 4B is an exemplary illustration of measured s-parameters ($S_{xx}$) results, according to certain embodiments.

FIG. 4B is an exemplary illustration 410 of measured s-parameters ($S_{xx}$), x=1, 2, 3, 4, results with capacitive loading. Signal 412 represents the values of measured s-parameters ($S_{11}$). Further, signal 414 represents values of measured $S_{22}$. Signal 416 represents the values of measured s-parameters ($S_{33}$). Signal 418 represents values of measured $S_{44}$. As shown in FIG. 4B, the measured results are in good agreement with the simulated results, as shown in FIG. 4A. Good isolation values were also observed for both simulated and measured results.

Figure 4C:
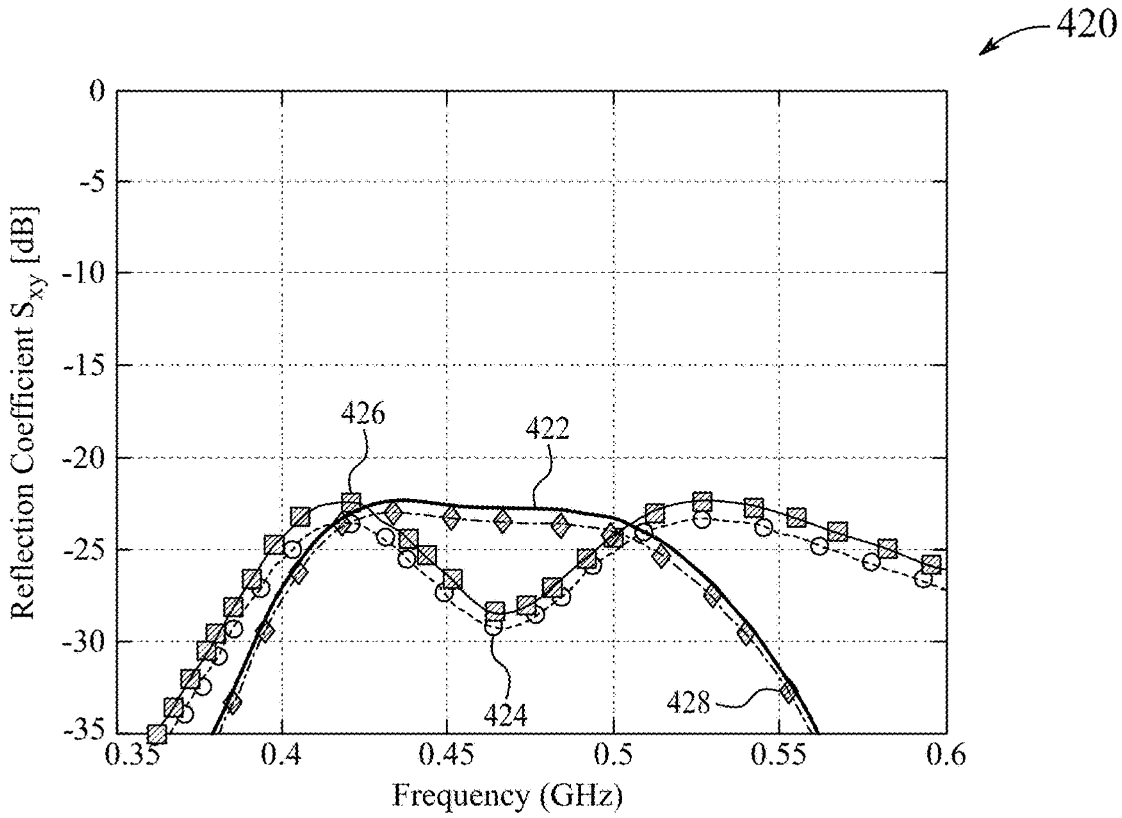
FIG. 4C is an exemplary illustration of simulated s-parameters ($S_{xy}$) results, according to certain embodiments.

FIG. 4C is an exemplary illustration 420 of simulated s-parameters ($S_{xy}$) results. Signal 422 represents the simulated values of s-parameters ($S_{11}$). Further, signal 424 represents the simulated values of $S_{22}$. Signal 426 represents the simulated values of s-parameters ($S_{33}$). Signal 428 represents the simulated values of $S_{44}$.

Figure 4D:
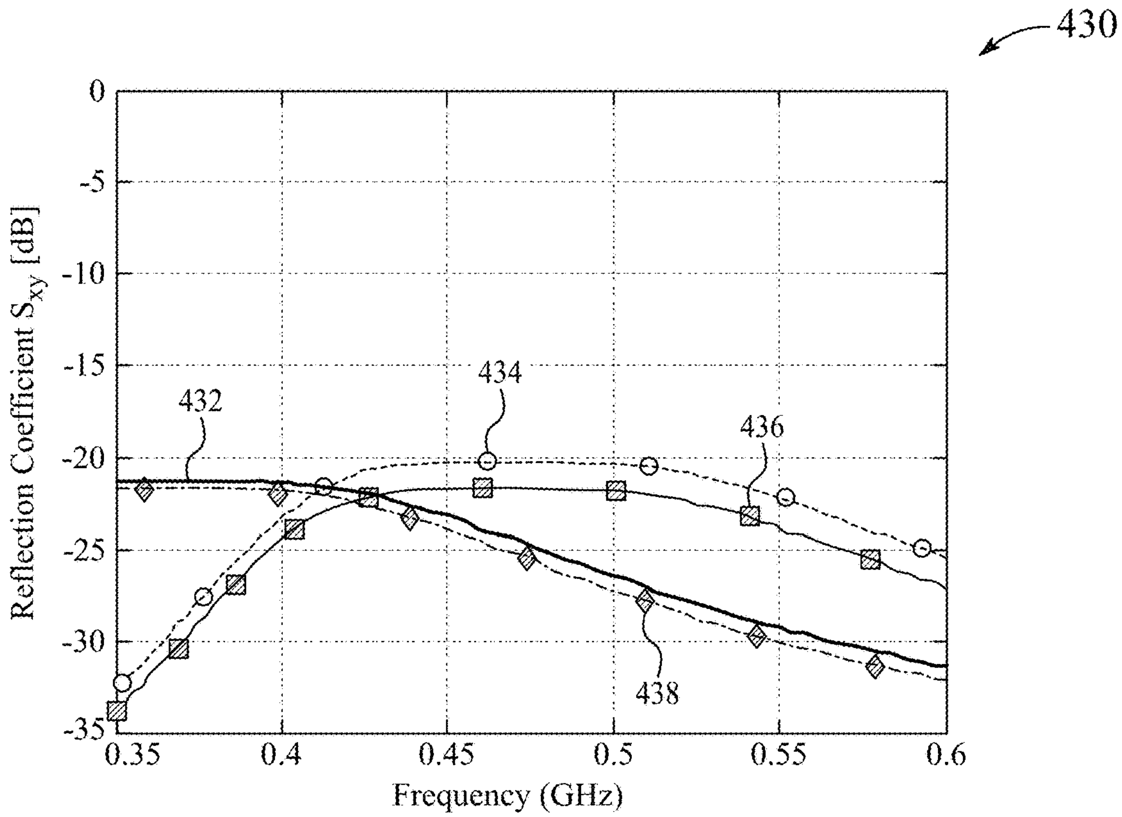
FIG. 4D is an exemplary illustration of measured s-parameters ($S_{xy}$) results, according to certain embodiments.

FIG. 4D is an exemplary illustration 430 of measured s-parameters ($S_{xy}$) results, according to certain embodiments. Signal 432 represents the values of s-parameters ($S_{13}$). Further, signal 434 represents values of $S_{14}$. Signal 436 represents the values of s-parameters ($S_{23}$). Signal 438 represents values of $S_{24}$. As shown in FIG. 4D, the measured results are in good agreement with the simulated results, as shown in FIG. 4C.

The reflection coefficients for all the four antenna elements are well below-10 dB for results in 430-510 MHz frequency band as shown in FIG. 4A-FIG. 4B, respectively. Both transmission coefficients are below −20 dB in the mentioned frequency band, which are considered good isolation levels for MIMO antenna 100 as shown in FIG. 4C-FIG. 4D. The conventional planar antennas designed for UHF band have a restricted bandwidth. However, the MIMO antenna 100 achieved −10 dB measured impedance bandwidth of at-least 80 MHz.

In an aspect, the fabricated MIMO antenna 100 was designed, optimized and analyzed using an Ansys Electromagnetics Suite. The Ansys Electromagnetics Suite (Ansys Electronics Desktop (AEDT)) is a platform that enables electronic system design. The parameters of the folded slot elements, feed structure, and the capacitance values were carefully tuned to achieve the compact MIMO antenna 100 to cover the 430-510 MHz frequency band with greater than 10 dB return loss. The optimized values of all the structural parameters mentioned in FIG. 2A-FIG. 2D, while the capacitance value of 8 pF is adjusted for the optimized design. The frequency band of the antenna may still be controlled to shift further towards lower frequencies or towards higher frequencies by adjusting only the capacitance value. Hence, the MIMO antenna 100 has the adaptability and flexibility to be used in other frequency bands.

Figure 5A:
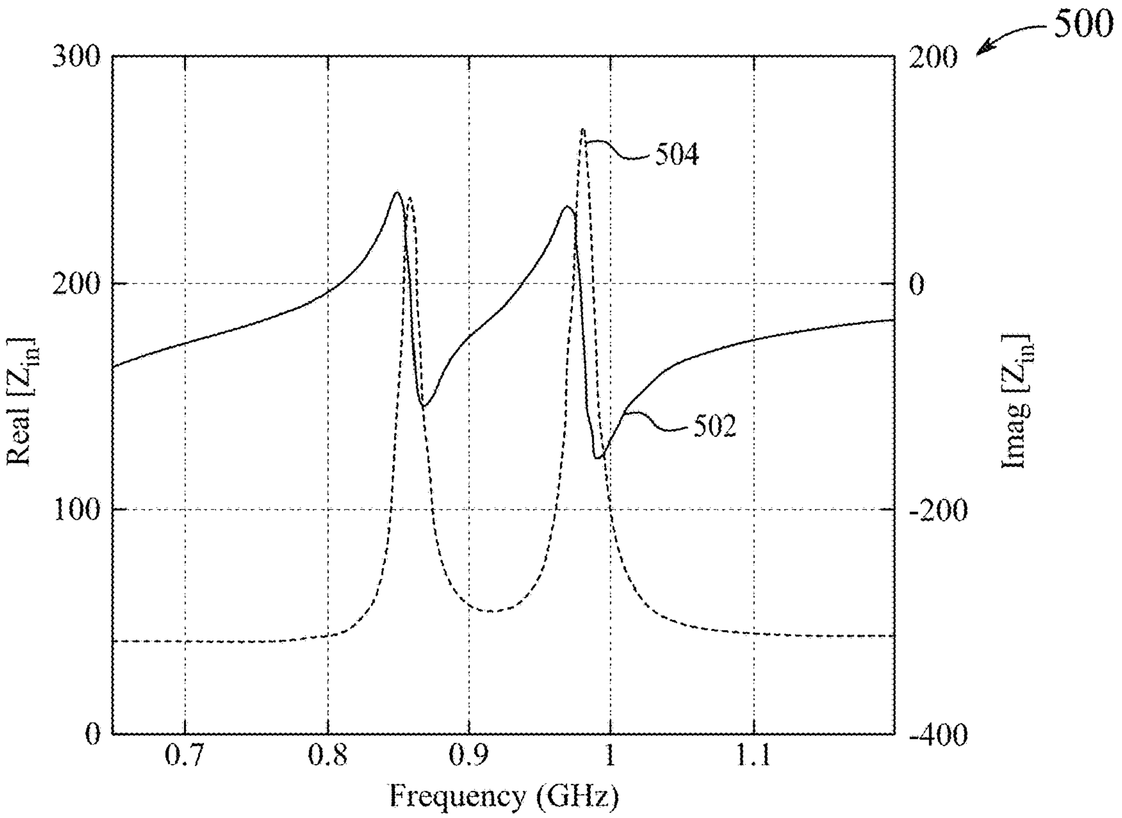
FIG. 5A is an exemplary illustration of an input impedance $Z_{in}$ of the MIMO antenna without capacitor, according to certain embodiments.

FIG. 5A is a graph 500 of an input impedance $Z_{in}$ of the MIMO antenna 100 without capacitive loading, according to certain embodiments. Signal 502 illustrates an imaginary part of the impedance. Signal 804 illustrates a real part of the impedance.

Figure 5B:
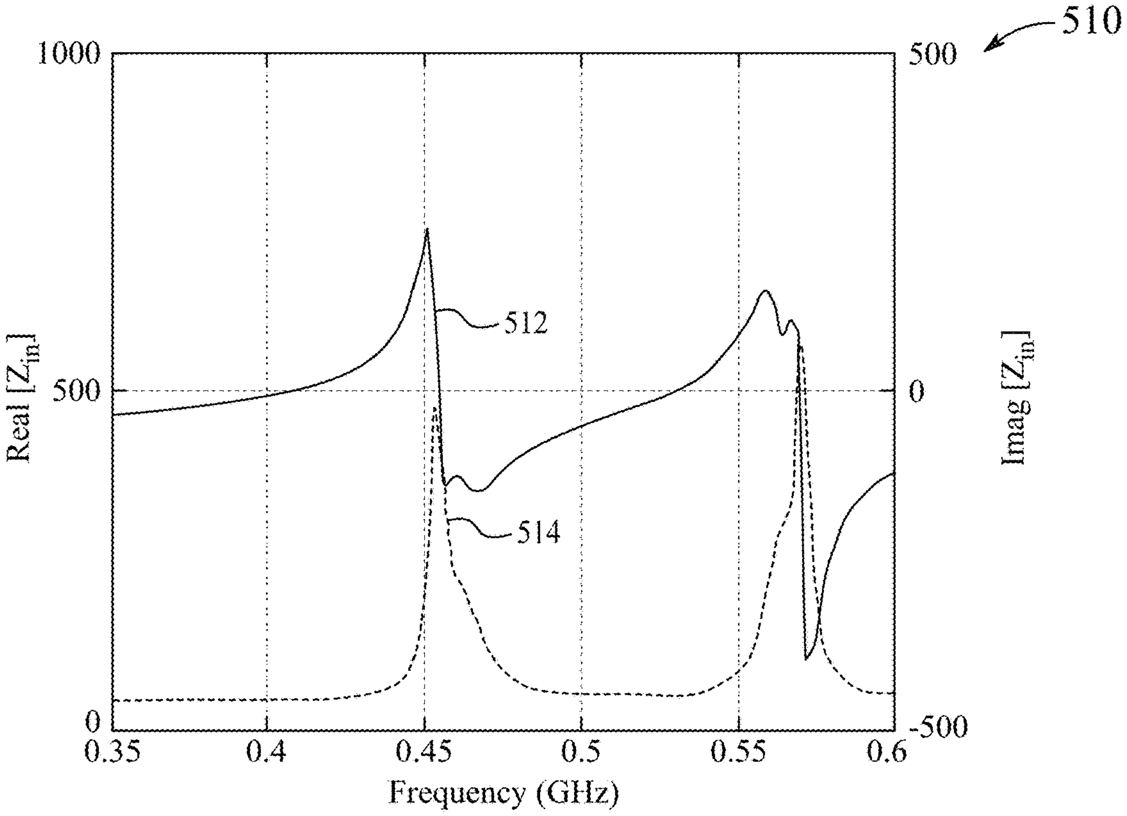
FIG. 5B is an exemplary illustration of the input impedance $Z_{in}$ of the MIMO antenna with capacitor, according to certain embodiments.

FIG. 5B is a graph 510 of the input impedance $Z_{in}$ of the MIMO antenna 100 with capacitive loading, according to certain embodiments. Signal 512 illustrates an imaginary part of the impedance (Real$\{Z_{in}\}$). Signal 514 illustrates a real part of the impedance (Imag$\{Z_{in}\}$). The real and imaginary values of $Z_{in}$ at the resonance frequencies are real positive values around 50Ω for Real$\{Z_{in}\}$, while Imag$\{Z_{in}\}$ is nearly equal to zero. The capacitive loading shifted the resonance to the desired lower frequency band. Ideally, for resonance, both real and imaginary parts should be 50Ω and zero, respectively.

During experimentation, the MIMO antenna 100 was realized and tuned at desired frequency band by reactive loading of the folded slot. FIG. 5A and FIG. 5B show the input impedance curves for the MIMO antenna 100 with and without the capacitive loading, respectively. The real and imaginary values of $Z_{in}$ at resonance frequencies are real positive values around 50Ω for Real$\{Z_{in}\}$ and Imag$\{Z_{in}\}$ is nearly equal to zero. It can be seen that the capacitive loading helped in bringing down the resonance at the desired lower frequency band.

Figure 6:
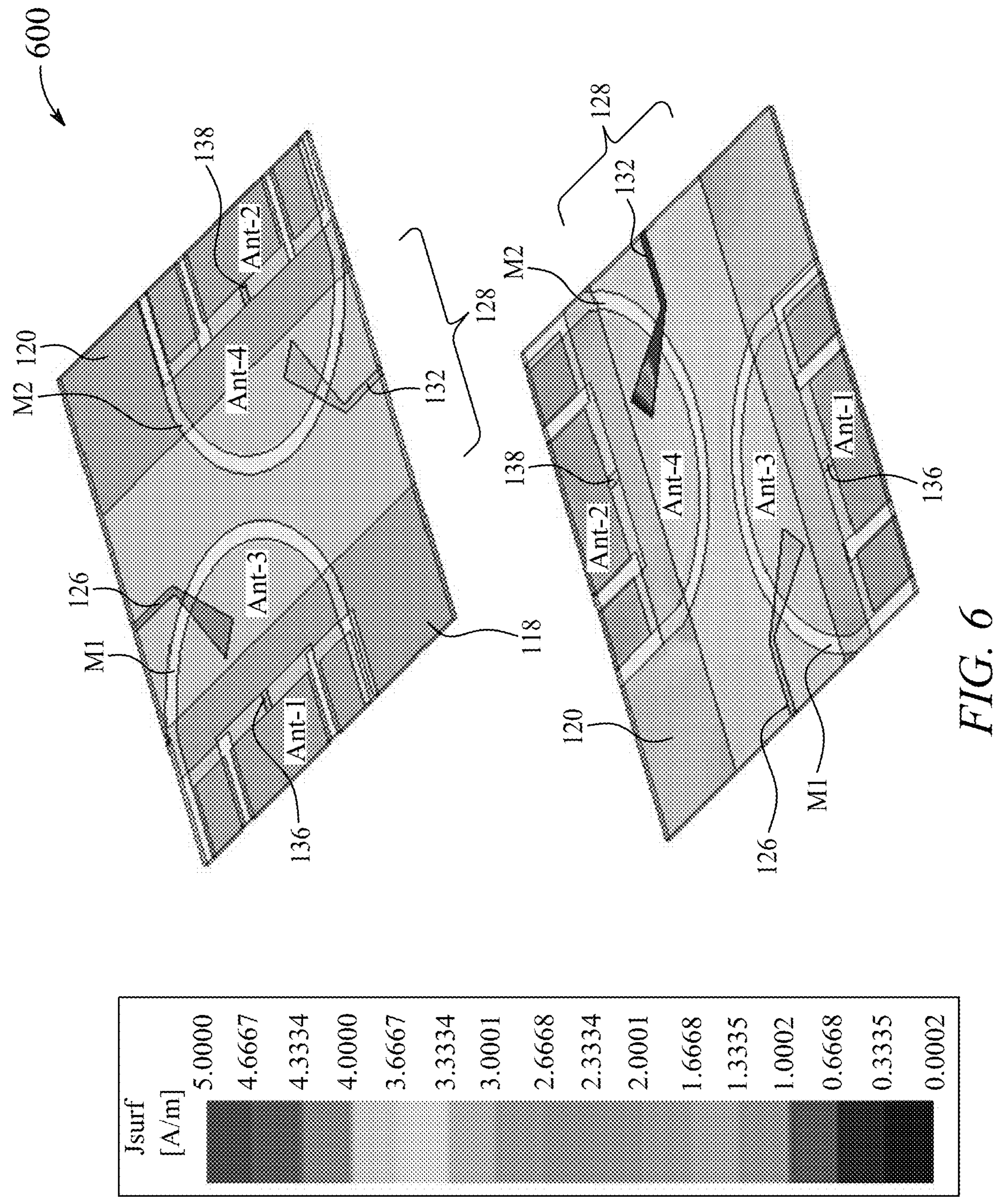
FIG. 6 is an exemplary illustration of current density distributions of the MIMO antenna, according to certain embodiments.

FIG. 6 is an exemplary illustration 600 of current density distributions of the MIMO antenna of the second antenna design shown in FIG. 2E to FIG. 2F. In an aspect, the current density distributions of the MIMO antenna 100 are plotted at 450 MHz. In order to analyze the antenna's radiation pattern, it is required to measure the magnitude of the power received or transmitted, and the phase angle of the antenna. These measurements should be specified in two orthogonal directions in order to capture all the components (polarizations) of the antenna. The electric fields (E-fields) are orthogonal to the direction of travel in the far field region. For example, the magnitude of the x-component of the E-field is A and the magnitude of the z-component of the E-field is B. The phase of the x-component is D, and the phase of the z-component is F (relative to the oscillation at frequency f). If D=F, the components are in phase and the polarization is linear. If D and F are separated by 90 degrees and the amplitudes are equal, the E-field is circularly polarized.

In an aspect, the MIMO antenna 100 was characterized for current density distributions and far-field patterns. FIG. 6 shows the current density distribution by exciting a single element at lower substrate board. It can be seen that the other ports are well isolated.

FIG. 7A to FIG. 7D illustrate the different 3-D radiation patterns of the four element folded slot-based MIMO antenna 100 for different antennas at 450 MHz. The folded-slot MIMO antenna 100 was characterized by its far-field radiation patterns and MIMO parameters. The peak gain and efficiency (% n) values were evaluated at 450 MHz. To understand the antenna's radiation pattern, in experimentation, each of the antennas was provided with input signals. FIG. 7A is an exemplary illustration 700 of a 3-D radiation pattern for the first antenna at 450 MHz. To measure peak gain and the efficiency of the first antenna, other ports of the MIMO antenna elements are terminated with a 50Ω load. A second port (second antenna 122) was terminated with 50-ohm load.

FIG. 7B is an exemplary illustration 710 of a 3-D radiation pattern of the four element folded slot-based MIMO antenna 100 for the second antenna at 450 MHz. To measure peak gain and the efficiency of the second antenna, other ports of the MIMO antenna elements are terminated with a 50Ω load. A second port (second antenna 122) was terminated with 50-ohm load.

FIG. 7C is an exemplary illustration 720 of the 3-D radiation pattern of the four element folded slot-based MIMO antenna for the third antenna at 450 MHz. To measure the peak gain and the efficiency of the third antenna, other ports of the MIMO antenna elements are terminated with a 50Ω load. A second port (second antenna 122) was terminated with 50-ohm load.

FIG. 7D is an exemplary illustration 730 of 3-D radiation pattern of the four element folded slot-based MIMO antenna for the fourth antenna at 450 MHZ. To measure the peak gain and the efficiency of the fourth antenna, other ports of the MIMO antenna elements are terminated with a 50Ω load. A second port (second antenna 122) was terminated with 50-ohm load.

FIG. 7A-FIG. 7D show the 3D gain radiation patterns for all of the four antenna elements. As evident from FIG. 7A-FIG. 7D, the MIMO antenna 100 achieves a peak gain of −2.3 dBi at 450 MHz with 92% radiation efficiency.

Figure 8A:
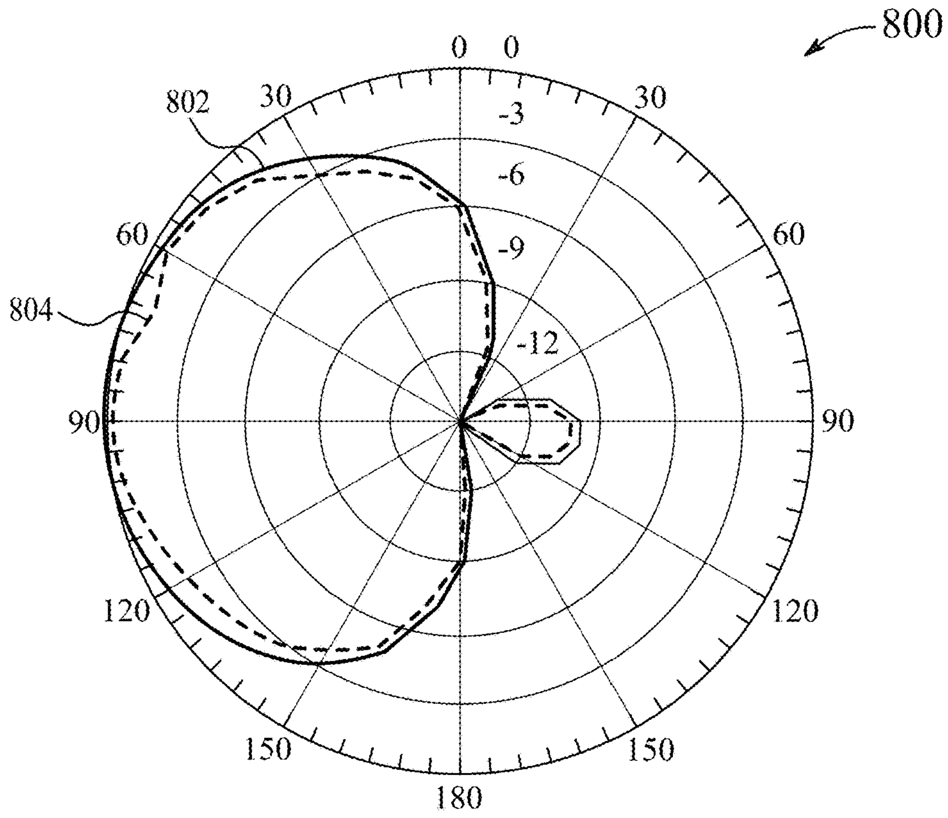
FIG. 8A is an exemplary graph illustrating simulated and measured radiation patterns of the first antenna at 450 MHz, according to certain embodiments.

FIG. 8A to FIG. 8D illustrate different 3-D simulated and measured radiation patterns of the four element folded slot-based MIMO antenna 100 at 450 MHZ. FIG. 8A is an exemplary graph 800 illustrating simulated and measured radiation patterns of the first antenna at 450 MHz. Signal 802 represents the simulated radiation pattern of the first antenna. Signal 804 represents the measured radiation pattern of the first antenna.

Figure 8B:
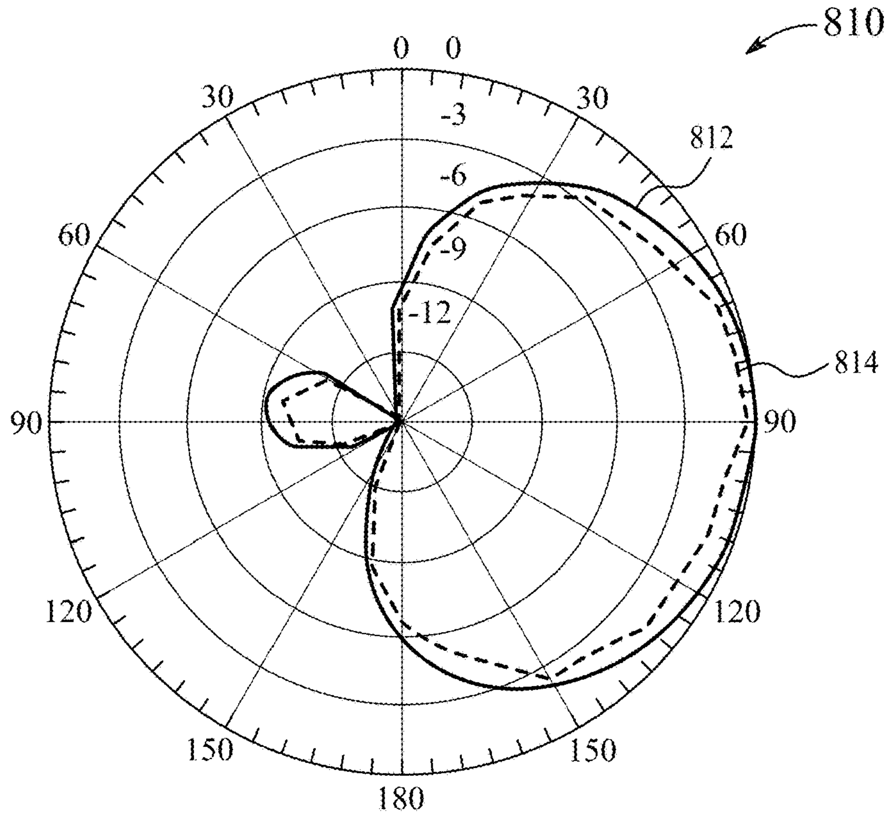
FIG. 8B is an exemplary graph illustrating simulated and measured radiation patterns of the second antenna at 450 MHz, according to certain embodiments.

FIG. 8B is an exemplary graph 810 illustrating simulated and measured radiation patterns of the second antenna at 450 MHz. Signal 812 represents the simulated radiation pattern of the second antenna. Signal 814 represents the measured radiation pattern of the second antenna.

Figure 8C:
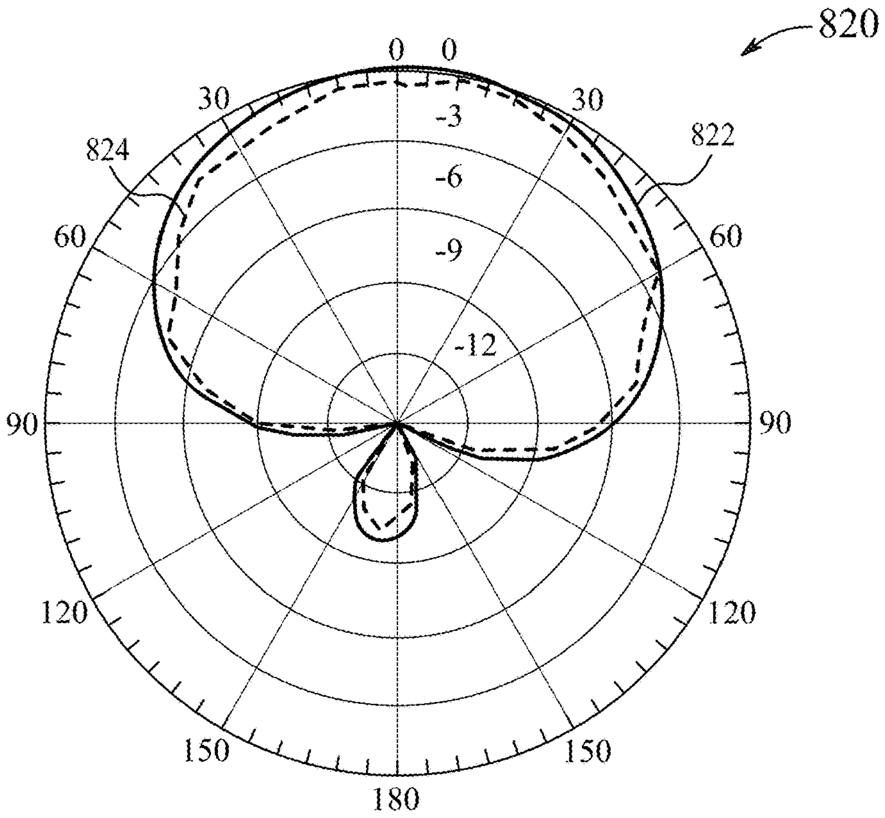
FIG. 8C is an exemplary graph illustrating simulated and measured radiation patterns of the third antenna at 450 MHZ, according to certain embodiments.

FIG. 8C is an exemplary graph 820 illustrating simulated and measured radiation patterns of the third antenna at 450 MHz. Signal 822 represents the simulated radiation pattern of the third antenna. Signal 824 represents the measured radiation pattern of the third antenna.

Figure 8D:
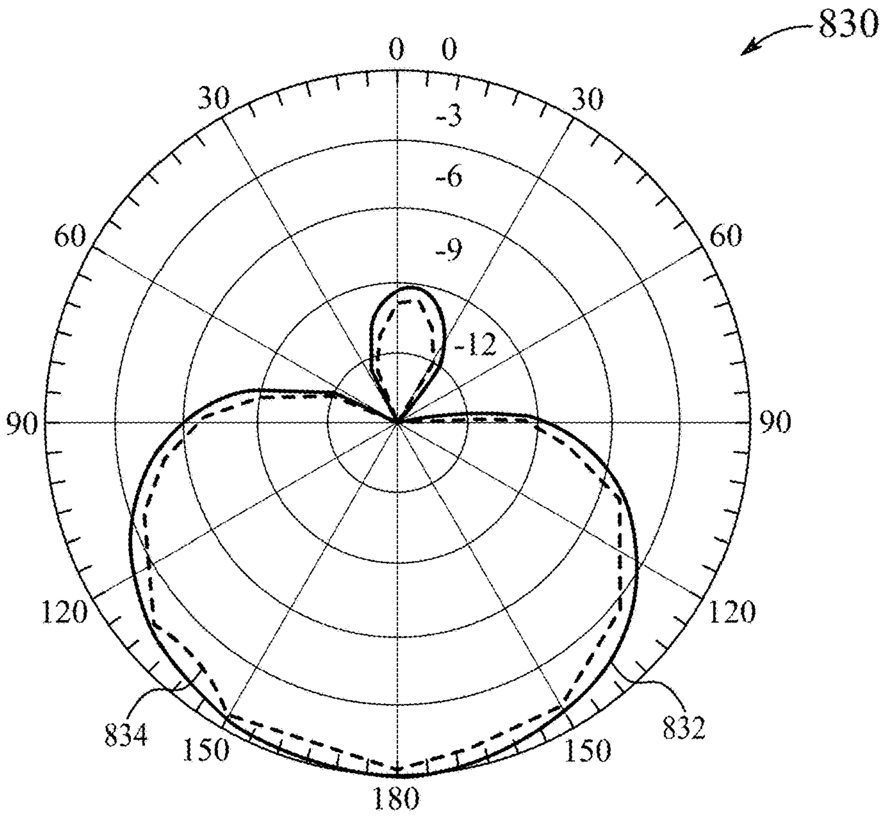
FIG. 8D is an exemplary graph illustrating simulated and measured radiation patterns of the fourth antenna at 450 MHz, according to certain embodiments.

FIG. 8D is exemplary graph 830 illustrating simulated and measured radiation patterns of the fourth antenna at 450 MHz. Signal 832 represents the simulated radiation pattern of the fourth antenna. Signal 834 represents the measured radiation pattern of the fourth antenna.

From FIG. 7A-FIG. 7D and FIG. 8A-FIG. 8D, it can be seen that all the antenna elements radiate in respective orthogonal directions, which reduces field coupling between MIMO antenna elements and hence pattern diversity is achieved. The radiation in the orthogonal directions also enhances the diversity gain performance of the MIMO antenna.

For an antenna to transmit simultaneous and independent data streams, isolation is required between the antenna(s) such that each antenna works independently without affecting the performance of the other antennas. The antennas should have good isolation, and their radiation patterns should not be same, or at least not very "correlated". To measure the isolation between the antennas the envelope correlation coefficient (ECC) is calculated.

The ECC describes the independence of the two antenna's radiation patterns. For example, if one antenna is completely horizontally polarized, and the other is completely vertically polarized, then the two antennas would have a correlation of zero. In similar manner, if one antenna only radiated energy towards the sky, and the other only radiated energy towards the ground, these antennas would also have an ECC of 0. The ECC is considered as an important factor for accounting the antennas' radiation pattern shape, polarization, a relative phase of the fields between the two antennas.

To verify diversity gain performance and field coupling between various MIMO channels, the ECC was calculated. The MIMO antenna 100 performed well for ECC values due to the unique orientation of 4-elements antennas, which resulted in orthogonal orientation for a maximum gain pattern in different directions. The ECC values were found to be less than 0.12 over the entire frequency band of operation, which confirmed the satisfactory diversity gain MIMO antenna performance.

The performance of the MIMO antenna 100 of the present disclosure was compared with the aforementioned existing antenna designs and is summarized in Table 1. It is observed from the Table 1 that the MIMO antenna 100 is efficient in comparison to conventional antenna designs.

TABLE 1

Summary of performance comparison

| References | Size ($mm^3$) | Antenna Type | Gain dBi | Freq. Bands MHz | Fractional BW (%) | % η |
|---|---|---|---|---|---|---|
| N. Behdad et al. | $0.145\lambda_o \times 0.15\lambda_o$ | Double slot | 1.7 | 852 | 2.4 | — |
| R. Azadegan et al. | $0.05\lambda_o \times 0.05\lambda_o$ | Slot | −3.0 | 300 | — | 20 |
| IEEE et al. | $0.067\lambda_o \times 0.067\lambda_o$ | Folded slot | −2.7 | 338 | 0.9 | 35 |
| A. Razavi et al. | $0.32\lambda_o \times 0.26\lambda_o$ | Cavity Backed Slot | 4.0 | 485/500 | 3.0 | — |
| R. Azadegan et al. | $0.065\lambda_o \times 0.065\lambda_o$ | Self-Complementary Slot | −4.5 | 336 | 1.1 | 19 |
| The present MIMO antenna 100 | 0.075 × 0.102 | Folded Slot | −2.3 | 437 | 17 | 92 |

It can be noticed from the Table 1 that the MIMO antenna 100 achieved greater size reduction of 66%, with better radiation efficiency of 92% and significantly better bandwidth performance. The MIMO antenna 100, having the meandering folded-slot antenna element with capacitive loading, is configured to achieve better radiation efficiency, bandwidth and pattern diversity performance at UHF band for CubeSats applications.

The first embodiment is illustrated with respect to FIG. 1A-FIG. 2F. The first embodiment describes a four element folded slot-based multiple-input-multiple-output (MIMO) antenna 100 for use on cubic shaped satellites (Cube-Sat) having dimensions of (about 50 mm to about 100 mm)×(about 50 to about 100 mm)×(about 50 to about 100 mm). The MIMO antenna 100 includes a dielectric circuit board 102, a metallic layer 116, a first meandering slot M1, a second meandering slot M2, a first feed horn 126, a second feed horn 132, a first capacitor 136 and a second capacitor 138. The dielectric circuit board 102 includes a surface dimension in the ranges of 50 mm to 100 mm in length by 50 mm to 100 mm in width, a top side 104, a bottom side 106, a first edge 108 opposite a second edge 110, and a third edge 112 opposite a fourth edge 114. The metallic layer 116 configured to cover a top side 104 of the dielectric circuit board 102, wrap around the first edge 108 and the second edge 110 and cover a first portion 118 of the bottom side 106 and a second portion 120 of the bottom side 106. The first meandering slot M1 located in the metallic layer 116, wherein the first meandering slot M1 is configured to wrap from the top side 104, over the first edge 108, and into the first portion 118 on the bottom side 106. The second meandering slot M2 located in the metallic layer 116, wherein the second meandering slot M2 is configured to wrap from the top side 104, over the second edge 110 and into the second portion 120 of the bottom side 106. The first feed horn 126 located in a gap portion 128 between the first portion 118 and the second portion 120 of the bottom side 106, wherein a feed line 130 of the first feed horn 126 extends from the third edge, and wherein the first feed horn 126 is directed towards the first meandering slot M1. The second feed horn 132 located in the gap portion 128, wherein a feed line 134 of the second feed horn 132 extends from the fourth edge 114, and wherein the second feed horn 132 is directed towards the second meandering slot M2. The first capacitor 136 connected to the metallic layer 116 across a slot section of the first meandering slot M1. The second capacitor 138 connected to the metallic layer 116 across a slot section of the second meandering slot M2.

In an aspect, the first portion 118 is configured to extend from the first edge 108 to about one fourth of the length of the bottom side 106 of the dielectric circuit board 102, the second portion 120 is configured to extend from the second edge 110 to about one fourth of the length of the bottom side 106 of the dielectric circuit board 102, and the gap portion 128 covers about one half of the length of the bottom side 106 of the dielectric circuit board 102.

In an aspect, the first meandering slot M1 includes a semicircular arch 122 located on the top side 104 and extending to about two thirds of the width of the dielectric circuit board 102 from the third edge 112 towards the fourth edge 114, wherein an apex of the semicircular arch 122 is located halfway between the second edge 110 and the first edge 108, wherein the semicircular arch 122 is configured to open towards the first edge 108; a first leg (A) connected to and perpendicular to a base of the semicircular arch 122 at an outer end of the semicircular arch 122 near the third edge 112, wherein the first leg (A) is configured to extend from the top side 104, over the first edge 108, and through about two thirds of a length of the first portion; a second leg (B) connected to and perpendicular to the first leg (A), wherein an outer width of the second leg (B) is about one fifth of the width of the dielectric circuit board 102; a third leg (C) connected to and perpendicular to the second leg (B), wherein the third leg (C) is configured to extend from the second leg (B), through the first portion 118, over the first edge 108, to about one fourth of the length of the top side 104 of the dielectric circuit board 102; a fourth leg (D) connected to and perpendicular to the third leg (C), wherein the fourth leg (D) is configured to extend parallel to the base of the semicircular arc for a distance equal to about one third of the width of the dielectric circuit board 102 and towards the fourth edge 114; a fifth leg (E) connected to and perpendicular to the fourth leg (D), wherein the fifth leg (E) is configured to extend from the top side 104, over the first edge 108, and through two thirds of the length of the first portion 118; a sixth leg (F) connected to and perpendicular to the fifth leg (E), wherein the sixth leg (F) is configured to extend from the fifth leg (E) towards the fourth edge 114, wherein an outer width of the sixth leg (F) is about one fifth of the width of the dielectric circuit board 102; and a seventh leg (G) connected to and perpendicular to the sixth leg, wherein the seventh leg (G) is configured to extend from the sixth leg (F), through the first portion, over the first edge 108, and connect to a meandering slot section at an inner end of the base of the semicircular arch.

In an aspect, the second meandering slot M2 includes a semicircular arch 124 located on the top side 104 and extending to about two thirds of the width of the dielectric circuit board 102 from the fourth edge 114 towards the third edge 112, wherein an apex of the semicircular arch 124 is located about halfway between the second edge 110 and the first edge 108, wherein the semicircular arch 124 is configured to open towards the second edge 110; a first leg (H) connected to and perpendicular to a base of the semicircular arch 124 at an outer end of the semicircular arch 124 near the fourth edge 114, wherein the first leg (H) is configured to extend from the top side 104, over the second edge 110, and through about two thirds of a length of the second portion 120; a second leg (I) connected to and perpendicular to the first leg (H), wherein an outer width of the second leg (I) is about one fifth of the width of the dielectric circuit board 102, wherein the second leg (I) is configured to extend from the fourth edge 114 towards the third edge 112; a third leg (J) connected to and perpendicular to the second leg (I), wherein the third leg (J) is configured to extend from the second leg (I), through the second portion 120, over the second edge 110, to about one fourth of the length of the top side 104 of the dielectric circuit board 102; a fourth leg connected to and perpendicular to the third leg (J), wherein the fourth leg (K) is configured to extend parallel to the base of the semicircular arc 124 for a distance equal to about one third of the width of the dielectric circuit board 102 and towards the third edge 112; a fifth leg (L) connected to and perpendicular to the fourth leg, wherein the fifth leg is configured to extend from the top side 104, over the second edge 110, and through about two thirds of the length of the second portion; a sixth leg (M) connected to and perpendicular to the fifth leg, wherein the sixth leg is configured to extend from the fifth leg towards the third edge 112, wherein an outer width of the second leg is about one fifth of the width of the dielectric circuit board 102; and a seventh leg (N) connected to and perpendicular to the sixth leg, wherein the seventh leg (N) is configured to extend from the sixth leg, through the second portion, over the second edge 110, and connect to a meandering slot section at an inner end of the base of the semicircular arch 124.

In an aspect, a first antenna element (ant-1) is formed by a metallic area enclosed by the third leg, the fourth leg and the fifth leg of the first meandering slot; a second antenna element (ant-2) is formed by a metallic area enclosed by the third leg, the fourth leg and the fifth leg of the first meandering slot M2; a third antenna element (ant-3) is formed in a metallic area on the top side 104 enclosed by the semicircular arch 124 and the fourth leg, and on the top side 104 and the bottom side 106 between the first leg and the third leg, and between the fifth leg and the seventh leg of the first meandering slot; and a fourth antenna element (ant-4) is formed in a metallic area on the top side 104 enclosed by the semicircular arch and the fourth leg, and on the top side 104 and the bottom side 106 between the first leg and the third leg, and between the fifth leg and the seventh leg of the second meandering slot M2.

In an aspect, the first capacitor 136 is connected across a center of the fourth leg of the first meandering slot; and the second capacitor 138 is connected across a center of the fourth leg of the second meandering slot M2.

In an aspect, a value of the first capacitor 136 is selected from the range of zero to 12 pF; and a value of the second capacitor 138 is selected from the range of zero to 12 pF.

In an aspect, a value of the first capacitor 136 is 8 pF; and a value of the second capacitor 138 is 8 pF.

In an aspect, a value of the first capacitor 136 is 8 pF; and a value of the second capacitor 138 is selected from the range of zero to 12 pF.

In an aspect, an opening of the first feed horn 126 is directed towards the first antenna element (ant-1) and the third antenna element (ant-3); and an opening of the second feed horn 132 is directed towards the second antenna element (ant-2) and the fourth antenna element (ant-2).

In an aspect, the first feed line 130 and the second feed line 134 are configured to receive a plurality of signal frequencies, and supply the plurality of signal frequencies to the first feed horn 126 and the second feed horn 132; the first feed horn 126 is configured to radiate the plurality of signal frequencies towards the first antenna element (ant-1) and the third antenna element; the second feed horn 132 is configured to radiate the plurality of signal frequencies towards the second antenna element and the fourth antenna element; and the four element folded slot-based MIMO antenna 100 is configured to resonate at signal frequencies in the range of 430 MHz to 510 MHz.

In an aspect, the first antenna element (ant-1) is configured to resonate at signal frequencies in the range of 430 MHz to 510 MHz in a first direction; the second antenna element (ant-2) is configured to resonate at signal frequencies in the range of 430 MHz to 510 MHz in a second direction orthogonal to the first direction; the third antenna element (ant-3) is configured to resonate at signal frequencies in the range of 430 MHz to 510 MHz in a third direction orthogonal to the first direction and the second direction; and the fourth antenna element (ant-4) is configured to resonate at signal frequencies in the range of 430 MHz to 510 MHz in a fourth direction orthogonal to the first direction, the second direction and the third direction.

In an aspect, the first feed line and the second feed line are configured to receive a plurality of signal frequencies, and supply the plurality of signal frequencies to the first feed horn 126 and the second feed horn; the first feed horn 126 is configured to radiate the plurality of signal frequencies towards the first antenna element (ant-1) and the third antenna element (ant-3); the second feed horn 132 is configured to radiate the plurality of signal frequencies towards the second antenna element (ant-2) and the fourth antenna element (ant-4); and the four element folded slot-based MIMO antenna 100 is configured to resonate at ultra-high frequencies.

The second embodiment is illustrated with respect to FIG. 1A-FIG. 2F. The second embodiment describes a method of forming a four element folded slot-based multiple-input-multiple-output (MIMO) antenna 100 for use on cubic shaped satellites (Cube-Sat) having dimensions of (50 to 100)×(50 to 100)×(50 to 100 $mm^3$). The method includes obtaining a dielectric circuit board 102 having a surface dimension of 50 mm to 100 mm in length and 50 mm to 100 mm in width, a top side 104, a bottom side 106, a first edge 108 opposite a second edge 110, and a third edge 112 opposite a fourth edge 114. The method includes covering the dielectric circuit board 102 with a metallic layer 116. The method includes etching, by laser milling, a gap portion 128 between a first portion 118 and a second portion 120 of the bottom side 106. The method includes etching, by laser milling, a first meandering slot M1 located in the metallic layer 116, wherein the first meandering slot M1 is configured to wrap from the top side 104, over the first edge 108, and into the first portion 118 on the bottom side 106. The method includes etching, by laser milling, a second meandering slot M2 located in the metallic layer 116, wherein the second meandering slot M2 is configured to wrap from the top side 104, over the second edge 110 and into the second portion 120 of the bottom side 106. The method includes depositing a first metallic feed line 130 in the gap portion, wherein the first metallic feed line extends from the third edge 112 towards the fourth edge 114. The method includes connecting a first feed horn 126 to the first metallic feed line such that an opening of the first feed horn 126 is directed towards the first meandering slot. The method includes depositing a second metallic feed line 134 in the gap portion, wherein the second metallic feed line extends from the fourth edge 114 towards the third edge 112. The method includes connecting a second feed horn 132 to the second metallic feed line such that an opening of the second feed horn 132 is directed towards the second meandering slot M2. The method includes connecting a first capacitor 136 to the metallic layer 116 across a slot section of the first meandering slot. The method includes connecting a second capacitor 138 to the metallic layer 116 across a slot section of the second meandering slot M2.

In an aspect, the method further includes etching the first meandering slot M1 by forming: a semicircular arch 122 located on the top side 104 and extending to about two thirds of the width of the dielectric circuit board 102 from the third edge 112 towards the fourth edge 114, wherein an apex of the semicircular arch is located halfway between the second edge 110 and the first edge 108, wherein the semicircular arch is configured to open towards the first edge 108; a first leg connected to and perpendicular to a base of the semicircular arch at an outer end of the semicircular arch near the third edge 112, wherein the first leg is configured to extend from the top side 104, over the first edge 108, and through about two thirds of a length of the first portion; a second leg connected to and perpendicular to the first leg, wherein an outer width of the second leg is about one fifth of the width of the dielectric circuit board 102; a third leg connected to and perpendicular to the second leg, wherein the third leg is configured to extend from the second leg, through the first portion, over the first edge 108, to about one fourth of the length of the top side 104 of the dielectric circuit board 102; a fourth leg connected to and perpendicular to the third leg, wherein the fourth leg is configured to extend parallel to the base of the semicircular arc for a distance equal to about one third of the width of the dielectric circuit board 102 and towards the fourth edge 114; a fifth leg connected to and perpendicular to the fourth leg, wherein the fifth leg is configured to extend from the top side 104, over the first edge 108, and through about two thirds of the length of the first portion; a sixth leg connected to and perpendicular to the fifth leg, wherein the sixth leg is configured to extend from the fifth leg towards the fourth edge 114, wherein an outer width of the second leg is about one fifth of the width of the dielectric circuit board 102; and a seventh leg connected to and perpendicular to the sixth leg, wherein the sixth leg is configured to extend from the sixth leg, through the first portion, over the first edge 108, and connect to a meandering slot section at an inner end of the base of the semicircular arch.

In an aspect, the method further includes etching the second meandering slot M2 by forming: a semicircular arch 124 located on the top side 104 and extending to about two thirds of the width of the dielectric circuit board 102 from the fourth edge 114 towards the third edge 112, wherein an apex of the semicircular arch is located about halfway between the second edge 110 and the first edge 108, wherein the semicircular arch is configured to open towards the second edge 110; a first leg connected to and perpendicular to a base of the semicircular arch at an outer end of the semicircular arch near the fourth edge 114, wherein the first leg is configured to extend from the top side 104, over the second edge 110, and through about two thirds of a length of the second portion; a second leg connected to and perpendicular to the first leg, wherein an outer width of the second leg is about one fifth of the width of the dielectric circuit board 102, wherein the second leg is configured to extend from the fourth edge 114 towards the third edge 112; a third leg connected to and perpendicular to the second leg, wherein the third leg is configured to extend from the second leg, through the second portion, over the second edge 110, to about one fourth of the length of the top side 104 of the dielectric circuit board 102; a fourth leg connected to and perpendicular to the third leg, wherein the fourth leg is configured to extend parallel to the base of the semicircular arc for a distance equal to about one third of the width of the dielectric circuit board 102 and towards the third edge 112; a fifth leg connected to and perpendicular to the fourth leg, wherein the fifth leg is configured to extend from the top side 104, over the second edge 110, and through about two thirds of the length of the second portion; a sixth leg connected to and perpendicular to the fifth leg, wherein the sixth leg is configured to extend from the fifth leg towards the third edge 112, wherein an outer width of the second leg is about one fifth of the width of the dielectric circuit board 102; and a seventh leg connected to and perpendicular to the sixth leg, wherein the seventh leg is configured to extend from the sixth leg, through the second portion, over the second edge 110, and connect to a meandering slot section at an inner end of the base of the semicircular arch.

In an aspect, the method further includes selecting a capacitance value of the first capacitor 136 from a range of zero to 12 pF; selecting a capacitance value of the second capacitor 138 from a range of zero to 12 pF; connecting the first capacitor 136 across a across a center of the fourth leg of the first meandering slot; and connecting the second capacitor 138 across a center of the fourth leg of the second meandering slot M2.

In an aspect, the method further includes selecting a capacitance value of the first capacitor 136 to be 8 pF; selecting a capacitance value of the second capacitor 138 to be 8 pF; applying a plurality of signal frequencies to the first feed line and the second feed line; resonating the four element folded slot-based MIMO antenna 100 at ultra-high frequencies in the range of 430 MHz to 510 MHz, wherein: the first antenna element (ant-1) is configured to resonate at signal frequencies in the range of 430 MHz to 510 MHz in a first direction; the second antenna element is configured to resonate at signal frequencies in the range of 430 MHz to 510 MHz in a second direction orthogonal to the first direction; the third antenna element is configured to resonate at signal frequencies in the range of 430 MHz to 510 MHz in a third direction orthogonal to the first direction and the second direction; and the fourth antenna element is configured to resonate at signal frequencies in the range of 430 MHz to 510 MHz in a fourth direction orthogonal to the first direction, the second direction and the third direction.

The third embodiment is illustrated with respect to FIG. 1A-FIG. 2F. The third embodiment describes a method for transmitting and receiving ultra-high frequency (UHF) signals with a four element folded slot-based multiple-input-multiple-output (MIMO) antenna 100. The method includes obtaining a dielectric circuit board 102 having a surface dimension of about 100 mm in length and about 100 mm in width, a top side 104, a bottom side 106, a first edge 108 opposite a second edge 110, and a third edge 112 opposite a fourth edge 114. The method includes covering the dielectric circuit board 102 with a metallic layer 116. The method includes etching, by laser milling, a gap portion between a first portion 118 and a second portion 120 of the bottom side 106. The method further includes forming, by laser etching, a first meandering slot M1 and a second meandering slot M2 in the metallic layer 116 which delineate a first antenna element, a second antenna element, a third antenna element and a fourth antenna element. The method further includes depositing a first metallic feed line in the gap portion, wherein the first metallic feed line extends from the third edge 112 towards the fourth edge 114. The method further includes connecting a first feed horn 126 to the first metallic feed line such that an opening of the first feed horn 126 is directed towards the first antenna element (ant-1) and the third antenna element (ant-3). The method further includes depositing a second metallic feed line in the gap portion, wherein the second metallic feed line extends from the fourth edge 114 towards the third edge 112. The method further includes connecting a second feed horn 132 to the second metallic feed line such that an opening of the second feed horn 132 is directed towards the second antenna element and the fourth antenna element. The method further includes connecting a first capacitor 136 to the metallic layer 116 across a slot section of the first meandering slot. The method further includes connecting a second capacitor 138 to the metallic layer 116 across a slot section of the second meandering slot M2. The method further includes applying a plurality of signal frequencies to the first feed line and the second feed line. The method further includes resonating the four element folded slot-based MIMO antenna 100 at ultra-high frequencies in the range of 430 MHz to 510 MHz, wherein: the first antenna element (ant-1) is configured to resonate at signal frequencies in a first direction; the second antenna element is configured to resonate at signal frequencies in a second direction orthogonal to the first direction; the third antenna element (ant-3) is configured to resonate at signal frequencies in a third direction orthogonal to the first direction and the second direction; and the fourth antenna element (ant-4) is configured to resonate at signal frequencies in a fourth direction orthogonal to the first direction, the second direction and the third direction.

The above described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A four element folded slot-based multiple-input-multiple-output (MIMO) antenna for use on cubic shaped satellites (Cube-Sat) having dimensions of (about 50 mm to about 100 mm)×(about 50 to about 100 mm)×(about 50 to about 100 mm), comprising:

a dielectric circuit board having a surface dimension in the ranges of 50 mm to 100 mm in length by 50 mm to 100 mm in width, a top side, a bottom side, a first edge opposite a second edge, and a third edge opposite a fourth edge;

a metallic layer configured to cover a top side of the dielectric circuit board, wrap around the first edge and the second edge and cover a first portion of the bottom side and a second portion of the bottom side;

a first meandering slot located in the metallic layer, wherein the first meandering slot is configured to wrap from the top side, over the first edge, and into the first portion on the bottom side;

a second meandering slot located in the metallic layer, wherein the second meandering slot is configured to wrap from the top side, over the second edge and into the second portion of the bottom side;

a first feed horn located in a gap portion between the first portion and the second portion of the bottom side, wherein a feed line of the first feed horn extends from the third edge, and wherein the first feed horn is directed towards the first meandering slot;

a second feed horn located in the gap portion, wherein a feed line of the second feed horn extends from the fourth edge, and wherein the second feed horn is directed towards the second meandering slot;

a first capacitor connected to the metallic layer across a slot section of the first meandering slot; and a second capacitor connected to the metallic layer across a slot section of the second meandering slot;

wherein:

the first portion is configured to extend from the first edge to about one fourth of the length of the bottom side of the dielectric circuit board;

the second portion is configured to extend from the second edge to about one fourth of the length of the bottom side of the dielectric circuit board; and the gap portion covers about one half of the length of the bottom side of the dielectric circuit board, wherein the first meandering slot comprises:

a semicircular arch located on the top side and extending to about two thirds of the width of the dielectric circuit board from the third edge towards the fourth edge, wherein an apex of the semicircular arch is located halfway between the second edge and the first edge, wherein the semicircular arch is configured to open towards the first edge;

a first leg connected to and perpendicular to a base of the semicircular arch at an outer end of the semicircular arch near the third edge, wherein the first leg is configured to extend from the top side, over the first edge, and through about two thirds of a length of the first portion;

a second leg connected to and perpendicular to the first leg, wherein an outer width of the second leg is about one fifth of the width of the dielectric circuit board;

a third leg connected to and perpendicular to the second leg, wherein the third leg is configured to extend from the second leg, through the first portion, over the first edge, to about one fourth of the length of the top side of the dielectric circuit board;

a fourth leg connected to and perpendicular to the third leg, wherein the fourth leg is configured to extend parallel to the base of the semicircular arc for a distance equal to about one third of the width of the dielectric circuit board and towards the fourth edge;

a fifth leg connected to and perpendicular to the fourth leg, wherein the fifth leg is configured to extend from the top side, over the first edge, and through two thirds of the length of the first portion;

a sixth leg connected to and perpendicular to the fifth leg, wherein the sixth leg is configured to extend from the fifth leg towards the fourth edge, wherein an outer width of the second leg is about one fifth of the width of the dielectric circuit board; and a seventh leg connected to and perpendicular to the sixth leg, wherein the seventh leg is configured to extend from the sixth leg, through the first portion, over the first edge, and connect to a meandering slot section at an inner end of the base of the semicircular arch.

2. The four element folded slot-based MIMO antenna of claim 1, wherein the second meandering slot comprises:

a semicircular arch located on the top side and extending to about two thirds of the width of the dielectric circuit board from the fourth edge towards the third edge, wherein an apex of the semicircular arch is located about halfway between the second edge and the first edge, wherein the semicircular arch is configured to open towards the second edge;

a first leg connected to and perpendicular to a base of the semicircular arch at an outer end of the semicircular arch near the fourth edge, wherein the first leg is configured to extend from the top side, over the second edge, and through about two thirds of a length of the second portion;

a second leg connected to and perpendicular to the first leg, wherein an outer width of the second leg is about one fifth of the width of the dielectric circuit board, wherein the second leg is configured to extend from the fourth edge towards the third edge;

a third leg connected to and perpendicular to the second leg, wherein the third leg is configured to extend from the second leg, through the second portion, over the second edge, to about one fourth of the length of the top side of the dielectric circuit board;

a fourth leg connected to and perpendicular to the third leg, wherein the fourth leg is configured to extend parallel to the base of the semicircular arc for a distance equal to about one third of the width of the dielectric circuit board and towards the third edge;

a fifth leg connected to and perpendicular to the fourth leg, wherein the fifth leg is configured to extend from the top side, over the second edge, and through about two thirds of the length of the second portion;

a sixth leg connected to and perpendicular to the fifth leg, wherein the sixth leg is configured to extend from the fifth leg towards the third edge, wherein an outer width of the second leg is about one fifth of the width of the dielectric circuit board; and a seventh leg connected to and perpendicular to the sixth leg, wherein the seventh leg is configured to extend from the sixth leg, through the second portion, over the second edge, and connect to a meandering slot section at an inner end of the base of the semicircular arch.

3. The four element folded slot-based MIMO antenna of claim 2, wherein:

a first antenna element is formed by a metallic area enclosed by the third leg, the fourth leg and the fifth leg of the first meandering slot;

a second antenna element is formed by a metallic area enclosed by the third leg, the fourth leg and the fifth leg of the second meandering slot;

a third antenna element is formed in a metallic area on the top side enclosed by the semicircular arch and the fourth leg, and on the top side and the bottom side between the first leg and the third leg, and between the fifth leg and the seventh leg of the first meandering slot; and a fourth antenna element is formed in a metallic area on the top side enclosed by the semicircular arch and the fourth leg, and on the top side and the bottom side between the first leg and the third leg, and between the fifth leg and the seventh leg of the second meandering slot.

4. The four element folded slot-based MIMO antenna of claim 3, wherein:

the first capacitor is connected across a center of the fourth leg of the first meandering slot; and the second capacitor is connected across a center of the fourth leg of the second meandering slot.

5. The four element folded slot-based MIMO antenna of claim 4, wherein:

a value of the first capacitor is selected from the range of zero to 12 pF; and a value of the second capacitor is selected from the range of zero to 12 pF.

6. The four element folded slot-based MIMO antenna of claim 4, wherein:

a value of the first capacitor is 8 pF; and a value of the second capacitor is 8 pF.

7. The four element folded slot-based MIMO antenna of claim 4, wherein:

a value of the first capacitor is 8 pF; and a value of the second capacitor is selected from the range of zero to 12 pF.

8. The four element folded slot-based MIMO antenna of claim 3, wherein:

an opening of the first feed horn is directed towards the first antenna element and the third antenna element; and an opening of the second feed horn is directed towards the second antenna element and the fourth antenna element.

9. The four element folded slot-based MIMO antenna of claim 3, wherein:

the first feed line and the second feed line are configured to receive a plurality of signal frequencies, and supply the plurality of signal frequencies to the first feed horn and the second feed horn;

the first feed horn is configured to radiate the plurality of signal frequencies towards the first antenna element and the third antenna element;

the second feed horn is configured to radiate the plurality of signal frequencies towards the second antenna element and the fourth antenna element; and the four element folded slot-based MIMO antenna is configured to resonate at signal frequencies in the range of 430 MHz to 510 MHz.

10. The four element folded slot-based MIMO antenna of claim 9, further comprising:

the first antenna element is configured to resonate at signal frequencies in the range of 430 MHz to 510 MHz in a first direction;

the second antenna element is configured to resonate at signal frequencies in the range of 430 MHz to 510 MHz in a second direction orthogonal to the first direction;

the third antenna element is configured to resonate at signal frequencies in the range of 430 MHz to 510 MHz in a third direction orthogonal to the first direction and the second direction; and the fourth antenna element is configured to resonate at signal frequencies in the range of 430 MHz to 510 MHz in a fourth direction orthogonal to the first direction, the second direction and the third direction.

11. The four element folded slot-based MIMO antenna of claim 3, wherein:

the first feed line and the second feed line are configured to receive a plurality of signal frequencies, and supply the plurality of signal frequencies to the first feed horn and the second feed horn;

the first feed horn is configured to radiate the plurality of signal frequencies towards the first antenna element and the third antenna element;

the second feed horn is configured to radiate the plurality of signal frequencies towards the second antenna element and the fourth antenna element; and the four element folded slot-based MIMO antenna is configured to resonate at ultra-high frequencies.

12. A method of forming a four element folded slot-based multiple-input-multiple-output (MIMO) antenna for use on cubic shaped satellites (Cube-Sat) having dimensions of (about 50 mm to about 100 mm)×(about 50 to about 100 mm)×(about 50 to about 100 mm), comprising:

obtaining a dielectric circuit board having a surface dimension of 50 mm to 100 mm in length and 50 mm to 100 mm in width, a top side, a bottom side, a first edge opposite a second edge, and a third edge opposite a fourth edge;

covering the dielectric circuit board with a metallic layer;

etching, by laser milling, a gap portion between a first portion and a second portion of the bottom side;

etching, by laser milling, a first meandering slot located in the metallic layer, wherein the first meandering slot is configured to wrap from the top side, over the first edge, and into the first portion on the bottom side;

wherein the first meandering slot is etched by forming:

a semicircular arch located on the top side and extending to about two thirds of the width of the dielectric circuit board from the third edge towards the fourth edge, wherein an apex of the semicircular arch is located halfway between the second edge and the first edge, wherein the semicircular arch is configured to open towards the first edge;

a first leg connected to and perpendicular to a base of the semicircular arch at an outer end of the semicircular arch near the third edge, wherein the first leg is configured to extend from the top side, over the first edge, and through about two thirds of a length of the first portion;

a second leg connected to and perpendicular to the first leg, wherein an outer width of the second leg is about one fifth of the width of the dielectric circuit board;

a third leg connected to and perpendicular to the second leg, wherein the third leg is configured to extend from the second leg, through the first portion, over the first edge, to about one fourth of the length of the top side of the dielectric circuit board;

a fourth leg connected to and perpendicular to the third leg, wherein the fourth leg is configured to extend parallel to the base of the semicircular arc for a distance equal to about one third of the width of the dielectric circuit board and towards the fourth edge;

a fifth leg connected to and perpendicular to the fourth leg, wherein the fifth leg is configured to extend from the top side, over the first edge, and through about two thirds of the length of the first portion;

a sixth leg connected to and perpendicular to the fifth leg, wherein the sixth leg is configured to extend from the fifth leg towards the fourth edge, wherein an outer width of the second leg is about one fifth of the width of the dielectric circuit board; and a seventh leg connected to and perpendicular to the sixth leg, wherein the seventh leg is configured to extend from the sixth leg, through the first portion, over the first edge, and connect to a meandering slot section at an inner end of the base of the semicircular arch;

etching, by laser milling, a second meandering slot located in the metallic layer, wherein the second meandering slot is configured to wrap from the top side, over the second edge and into the second portion of the bottom side;

depositing a first metallic feed line in the gap portion, wherein the first metallic feed line extends from the third edge towards the fourth edge;

connecting a first feed horn to the first metallic feed line such that an opening of the first feed horn is directed towards the first meandering slot;

depositing a second metallic feed line in the gap portion, wherein the second metallic feed line extends from the fourth edge towards the third edge;

connecting a second feed horn to the second metallic feed line such that an opening of the second feed horn is directed towards the second meandering slot;

connecting a first capacitor to the metallic layer across a slot section of the first meandering slot; and connecting a second capacitor to the metallic layer across a slot section of the second meandering slot.

13. The method of claim 12, further comprising etching the second meandering slot by forming:

a semicircular arch located on the top side and extending to about two thirds of the width of the dielectric circuit board from the fourth edge towards the third edge, wherein an apex of the semicircular arch is located about halfway between the second edge and the first edge, wherein the semicircular arch is configured to open towards the second edge;

a first leg connected to and perpendicular to a base of the semicircular arch at an outer end of the semicircular arch near the fourth edge, wherein the first leg is configured to extend from the top side, over the second edge, and through about two thirds of a length of the second portion;

a second leg connected to and perpendicular to the first leg, wherein an outer width of the second leg is about one fifth of the width of the dielectric circuit board, wherein the second leg is configured to extend from the fourth edge towards the third edge;

a third leg connected to and perpendicular to the second leg, wherein the third leg is configured to extend from the second leg, through the second portion, over the second edge, to about one fourth of the length of the top side of the dielectric circuit board;

a fourth leg connected to and perpendicular to the third leg, wherein the fourth leg is configured to extend parallel to the base of the semicircular arc for a distance equal to about one third of the width of the dielectric circuit board and towards the third edge;

a fifth leg connected to and perpendicular to the fourth leg, wherein the fifth leg is configured to extend from the top side, over the second edge, and through about two thirds of the length of the second portion;

a sixth leg connected to and perpendicular to the fifth leg, wherein the sixth leg is configured to extend from the fifth leg towards the third edge, wherein an outer width of the sixth leg is about one fifth of the width of the dielectric circuit board; and a seventh leg connected to and perpendicular to the sixth leg, wherein the seventh leg is configured to extend from the sixth leg, through the second portion, over the second edge, and connect to a meandering slot section at an inner end of the base of the semicircular arch.

14. The method of claim 13, further comprising:

selecting a capacitance value of the first capacitor from a range of zero to 12 pF;

selecting a capacitance value of the second capacitor from a range of zero to 12 pF;

connecting the first capacitor across a across a center of the fourth leg of the first meandering slot; and connecting the second capacitor across a center of the fourth leg of the second meandering slot.

15. The method of claim 13, further comprising:

selecting a capacitance value of the first capacitor to be 8 pF;

selecting a capacitance value of the second capacitor to be 8 pF;

applying a plurality of signal frequencies to the first feed line and the second feed line;

resonating the four element folded slot-based MIMO antenna at ultra high frequencies in the range of 430 MHz to 510 MHz, wherein:

the first antenna element is configured to resonate at signal frequencies in the range of 430 MHz to 510 MHz in a first direction;

the second antenna element is configured to resonate at signal frequencies in the range of 430 MHz to 510 MHz in a second direction orthogonal to the first direction;

the third antenna element is configured to resonate at signal frequencies in the range of 430 MHz to 510 MHz in a third direction orthogonal to the first direction and the second direction; and the fourth antenna element is configured to resonate at signal frequencies in the range of 430 MHz to 510 MHz in a fourth direction orthogonal to the first direction, the second direction and the third direction.

* * * * *